(12) United States Patent
Hindy et al.

(10) Patent No.: US 12,095,705 B2
(45) Date of Patent: Sep. 17, 2024

(54) CHANNEL STATE INFORMATION REPORT CONFIGURATION

(71) Applicant: Lenovo (Singapore) Pte. Ltd., New Tech Park (SG)

(72) Inventors: Ahmed Hindy, Aurora, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/467,974

(22) Filed: Sep. 15, 2023

(65) Prior Publication Data
US 2024/0014985 A1 Jan. 11, 2024

Related U.S. Application Data

(63) Continuation of application No. 17/515,107, filed on Oct. 29, 2021, now Pat. No. 11,799,613.

(60) Provisional application No. 63/117,444, filed on Nov. 23, 2020, provisional application No. 63/108,251, filed on Oct. 30, 2020.

(51) Int. Cl.
*H04L 5/00* (2006.01)
*H04B 7/024* (2017.01)
*H04B 7/06* (2006.01)
*H04W 24/10* (2009.01)

(52) U.S. Cl.
CPC ........... *H04L 5/0057* (2013.01); *H04B 7/024* (2013.01); *H04B 7/0626* (2013.01); *H04W 24/10* (2013.01)

(58) Field of Classification Search
CPC ..... H04L 5/0057; H04B 7/024; H04B 7/0626; H04B 7/0632; H04B 7/0639; H04W 24/10
See application file for complete search history.

(56) References Cited

U.S. PATENT DOCUMENTS

2013/0003788 A1 1/2013 Marinier et al.

FOREIGN PATENT DOCUMENTS

EP 2587876 B1 * 4/2017 ............. H04B 7/024

OTHER PUBLICATIONS

Ericsson, Views on CSI Framework for multi-point TRP (Year: 2019).*

(Continued)

*Primary Examiner* — Ayanah S George
(74) *Attorney, Agent, or Firm* — Kunzler Bean & Adamson

(57) ABSTRACT

Apparatuses, methods, and systems are disclosed for CSI report configuration. One method includes receiving at least one CSI reporting setting. The at least one CSI reporting setting includes at least one CSI RS resource setting, and the CSI reporting setting includes an indication of CSI feedback reporting for multiple transmission points in a mobile communication network. The method includes identifying a set of transmission hypotheses based on the CSI reporting setting. The hypotheses include a combination of single-point transmission from at least one TRP, or multi-point joint transmission from two TRPs. The method includes receiving at least one CSI reference signal resource transmitted from the mobile communication network based on the CSI reference signal resource setting. The method includes generating a set of at least one CSI report based on the CSI reporting setting.

20 Claims, 11 Drawing Sheets

(56) References Cited

OTHER PUBLICATIONS

3GPP, "3rd Generation Partnership Project; Technical Specification Group Radio Access Network; NR; Multiplexing and channel coding (Release 16)", 3GPP TS 38.212 V16.7.0, Nov. 2021, pp. 1-153.
3GPP, "3rd Generation Partnership Project; Technical Specification Group Radio Access Network; NR; Physical layer procedures for data (Release 16)", 3GPP TS 38.214 V16.7.0, Nov. 2021, pp. 1-172.
3GPP, "3rd Generation Partnership Project; Technical Specification Group Radio Access Network; NR; Radio Resource Control (RRC) protocol specification (Release 16)", 3GPP TS 38.331 V16.6.0, Nov. 2021, pp. 1-961.
Samsung et al., "WF on Type I and II CSI codebooks", 3GPP TSG-RAN WG1 #89 R1-1709232, May 15-19, 2017, pp. 1-24.
Huawei, Hisilicon, "CSI measurement enhancement for multi-TRP/panel transmission", 3GPP TSG RAN WG1 Meeting #97 R1-1906038, May 13-17, 2019, pp. 1-4.
LG Electronics, "Discussion on CSI enhancement for NCJT", 3GPP TSG RAN WG1 #97 R1-1906736, May 13-17, 2019, pp. 1-3.
Ericsson, "Views on CSI framework for multi-TRP", 3GPP TSG RAN WG1 Meeting #97 R1-1907424, May 13-17, 2019, pp. 1-2.
Spreadtrum Communications, "Discussion on CSI enhancement for multiple TRP/Panel transmission", 3GPP TSG RAN WG1 #98 R1-1908961, Aug. 26-30, 2019, pp. 1-4.

\* cited by examiner

400

```
-- ASN1START
-- TAG-CSI-REPORTCONFIG-START

CSI-ReportConfig ::=                   SEQUENCE {
    reportConfigId                     CSI-ReportConfigId,
    carrier                            ServCellIndex              OPTIONAL,   -- Need S
    resourcesForChannelMeasurement     CSI-ResourceConfigId,
    csi-IM-ResourcesForInterference    CSI-ResourceConfigId       OPTIONAL,   -- Need R
    nzp-CSI-RS-ResourcesForInterference CSI-ResourceConfigId      OPTIONAL,   -- Need R reportConfigType                   CHOICE {
        periodic                           SEQUENCE {
            reportSlotConfig                   CSI-ReportPeriodicityAndOffset,
            pucch-CSI-ResourceList             SEQUENCE (SIZE (1..maxNrofBWPs)) OF PUCCH-CSI-Resource
        },
        semiPersistentOnPUCCH              SEQUENCE {
            reportSlotConfig                   CSI-ReportPeriodicityAndOffset,
            pucch-CSI-ResourceList             SEQUENCE (SIZE (1..maxNrofBWPs)) OF PUCCH-CSI-Resource
        },
        semiPersistentOnPUSCH              SEQUENCE {
            reportSlotConfig                   ENUMERATED {sl5, sl10, sl20, sl40, sl80, sl160, sl320},
            reportSlotOffsetList               SEQUENCE (SIZE (1..maxNrofUL-Allocations)) OF INTEGER(0..32),
            p0alpha                            P0-PUSCH-AlphaSetId
        },
        aperiodic                          SEQUENCE {
            reportSlotOffsetList               SEQUENCE (SIZE (1..maxNrofUL-Allocations)) OF INTEGER(0..32)
        }
    },
    mTRP-CSI-Enabled                   ENUMERATED {TRUE}          OPTIONAL,   -- Need R

[...............]
}

-- TAG-CSI-REPORTCONFIG-STOP
-- ASN1STOP
```

```
-- ASN1START
-- TAG-CSI-REPORTCONFIG-START

CSI-ReportConfig ::=               SEQUENCE {
    reportConfigId                     CSI-ReportConfigId,
    carrier                            ServCellIndex           OPTIONAL,    -- Need S
    resourcesForChannelMeasurement     CSI-ResourceConfigId,
    csi-IM-ResourcesForInterference    CSI-ResourceConfigId    OPTIONAL,    -- Need R
    nzp-CSI-RS-ResourcesForInterference CSI-ResourceConfigId   OPTIONAL,    -- Need R reportConfigType                   CHOICE {
        periodic                           SEQUENCE {
            reportSlotConfig                   CSI-ReportPeriodicityAndOffset,
            pucch-CSI-ResourceList             SEQUENCE (SIZE (1..maxNrofBWPs)) OF PUCCH-CSI-Resource
        },
        semiPersistentOnPUCCH              SEQUENCE {
            reportSlotConfig                   CSI-ReportPeriodicityAndOffset,
            pucch-CSI-ResourceList             SEQUENCE (SIZE (1..maxNrofBWPs)) OF PUCCH-CSI-Resource
        },
        semiPersistentOnPUSCH              SEQUENCE {
            reportSlotConfig                   ENUMERATED {sl5, sl10, sl20, sl40, sl80, sl160, sl320},
            reportSlotOffsetList               SEQUENCE (SIZE (1..maxNrofUL-Allocations)) OF INTEGER(0..32),
            p0alpha                            P0-PUSCH-AlphaSetId
        },
        aperiodic                          SEQUENCE {
            reportSlotOffsetList               SEQUENCE (SIZE (1..maxNrofUL-Allocations)) OF INTEGER(0..32)
        }
    },
    CMRsharing                         ENUMERATED {TRUE}       OPTIONAL,    -- Need R

[............]
}

-- TAG-CSI-REPORTCONFIG-STOP
-- ASN1STOP
```

```
-- ASN1START
-- TAG-NZP-CSI-RS-RESOURCESET-START
NZP-CSI-RS-ResourceSet ::=        SEQUENCE {
    nzp-CSI-ResourceSetId             NZP-CSI-RS-ResourceSetId,
    nzp-CSI-RS-Resources              SEQUENCE (SIZE (1..maxNrofNZP-CSI-RS-ResourcesPerSet)) OF
NZP-CSI-RS-ResourceId,
    CMR-Group1                        SEQUENCE (SIZE (1..maxNrofNZCRsPerCMR-Group)) OF NZP-CSI-RS-
ResourceId                                                                            OPTIONAL, -- Need R
    CMR-Group2                        SEQUENCE (SIZE (1..maxNrofNZCRsPerCMR-Group)) OF NZP-CSI-RS-
ResourceId                                                                            OPTIONAL, -- Need R
    repetition                        ENUMERATED { on, off }                           OPTIONAL, -- Need S
    aperiodicTriggeringOffset         INTEGER(0..6)                                    OPTIONAL, -- Need S
    trs-Info                          ENUMERATED {true}                                OPTIONAL, -- Need R
    ...,
    [[
    aperiodicTriggeringOffset-r16     INTEGER(0..31)                                   OPTIONAL  -- Need S
    ]]
}

-- TAG-NZP-CSI-RS-RESOURCESET-STOP
-- ASN1STOP
```

```
NZP-CSI-RS-ResourceSet ::=          SEQUENCE {
    nzp-CSI-ResourceSetId               NZP-CSI-RS-ResourceSetId,
    nzp-CSI-RS-Resources                SEQUENCE (SIZE (1..maxNrofNZP-CSI-RS-ResourcesPerSet)) OF
NZP-CSI-RS-ResourceId,
    CMR-Group1                          SEQUENCE (SIZE (1..maxNrofCMRsPerCMR-Group)) OF NZP-CSI-RS-
ResourceId                                                              OPTIONAL,  -- Need R
    CMR-Group2                          SEQUENCE (SIZE (1..maxNrofCMRsPerCMR-Group)) OF NZP-CSI-RS-
ResourceId                                                              OPTIONAL,  -- Need R
    repetition                          ENUMERATED { on, off }          OPTIONAL,  -- Need S
    aperiodicTriggeringOffset           INTEGER(0..6)                   OPTIONAL,  -- Need S
    trs-Info                            ENUMERATED {true}               OPTIONAL,  -- Need R
    ...,
    [[
    aperiodicTriggeringOffset-r16       INTEGER(0..31)                  OPTIONAL   -- Need S
    ]]
    nCMR-Pairs                          INTEGER(1,2,3,4)                OPTIONAL   -- Need R
}

-- TAG-NZP-CSI-RS-RESOURCESET-STOP
-- ASN1STOP
-- ASN1STOP
```

```
-- ASN1START
-- TAG-CSI-REPORTCONFIG-START

CSI-ReportConfig ::=               SEQUENCE {
    reportConfigId                     CSI-ReportConfigId,
    carrier                            ServCellIndex                OPTIONAL,     -- Need S
    resourcesForChannelMeasurement     CSI-ResourceConfigId,
    csi-IM-ResourcesForInterference    CSI-ResourceConfigId         OPTIONAL,     -- Need R
    nzp-CSI-RS-ResourcesForInterference CSI-ResourceConfigId        OPTIONAL,     -- Need R

[...............]

timeRestrictionForChannelMeasurements       ENUMERATED {configured, notConfigured},
    timeRestrictionForInterferenceMeasurements  ENUMERATED {configured, notConfigured},
    codebookConfig                              CodebookConfig               OPTIONAL,     -- Need R
    codebookConfig2                             CodebookConfig               OPTIONAL,     -- Need R
    dummy                                       ENUMERATED {n1, n2}          OPTIONAL,     -- Need R

[...............]

reportQuantity-r16          CHOICE {
        cri-SINR-r16                NULL,
        ssb-Index-SINR-r16          NULL
    }                                                                OPTIONAL,     -- Need R
    codebookConfig-r16                          CodebookConfig-r16           OPTIONAL      -- Need R
    codebookConfig2-r17                         CodebookConfig-r17           OPTIONAL      -- Need R
    ]]
}

[...............]

-- TAG-CSI-REPORTCONFIG-STOP
-- ASN1STOP
```

```
-- ASN1START
-- TAG-CSI-REPORTCONFIG-START

CSI-ReportConfig ::=                     SEQUENCE {
    reportConfigId                           CSI-ReportConfigId,
    carrier                                  ServCellIndex               OPTIONAL,    -- Need S
    resourcesForChannelMeasurement           CSI-ResourceConfigId,
    csi-IM-ResourcesForInterference          CSI-ResourceConfigId        OPTIONAL,    -- Need R
    nzp-CSI-RS-ResourcesForInterference      CSI-ResourceConfigId        OPTIONAL,    -- Need R

[..................]

reportQuantity                           CHOICE {
        none                                     NULL,
        cri-RI-PMI-CQI                           NULL,
        cri-RI-i1                                NULL,
        cri-RI-i1-CQI                            SEQUENCE {
            pdsch-BundleSizeForCSI                   ENUMERATED {n2, n4}    OPTIONAL    -- Need S
        },
        cri-RI-CQI                               NULL,
        cri-RSRP                                 NULL,
        ssb-Index-RSRP                           NULL,
        cri-RI-LI-PMI-CQI                        NULL
    },
    reportQuantity1                          CHOICE {
        none                                     NULL,
        cri-RI-PMI-CQI                           NULL,
        cri-RI-i1                                NULL,
        cri-RI-i1-CQI                            SEQUENCE {
            pdsch-BundleSizeForCSI                   ENUMERATED {n2, n4}    OPTIONAL    -- Need S
        },
        cri-RI-CQI                               NULL,
        cri-RSRP                                 NULL,
        ssb-Index-RSRP                           NULL,
        cri-RI-LI-PMI-CQI                        NULL
    },                                                                   OPTIONAL,    -- Need R

}

[..................]

-- TAG-CSI-REPORTCONFIG-STOP
-- ASN1STOP
```

FIG. 9

CHANNEL STATE INFORMATION REPORT CONFIGURATION

CROSS-REFERENCE TO RELATED APPLICATIONS

This application is a continuation application of U.S. patent application Ser. No. 17/515,107 filed on Oct. 29, 2021, which claims priority to U.S. Patent Application Ser. No. 63/108,251 entitled "APPARATUSES, METHODS, AND SYSTEMS FOR CSI ENHANCEMENTS FOR MULTI-TRP WITH CONFINED CONFIGURATION AND REPORTING" and filed on Oct. 30, 2020 for Ahmed Hindy and U.S. Patent Application Ser. No. 63/117,444 entitled "CSI ENHANCEMENTS FOR MULTI-TRP" and filed on Nov. 23, 2020 for Ahmed Hindy, all of which are incorporated herein by reference their its entirety.

FIELD

The subject matter disclosed herein relates generally to wireless communications and more particularly relates to channel state information report configuration.

BACKGROUND

In certain wireless communications networks, there may be multiple TRPs. In such networks, there may be inefficient and/or excessive communications.

BRIEF SUMMARY

Methods for channel state information report configuration are disclosed. Apparatuses and systems also perform the functions of the methods. One embodiment of a method includes receiving, at a user equipment, at least one channel state information reporting setting. The at least one channel state information reporting setting includes at least one channel state information reference signal resource setting, and the channel state information reporting setting includes an indication of channel state information feedback reporting for multiple transmission points in a mobile communication network. In some embodiments, the method includes identifying a set of transmission hypotheses based on the channel state information reporting setting. The hypotheses include a combination of single-point transmission from at least one transmission and reception point, or multi-point joint transmission from two transmission and reception points. In certain embodiments, the method includes receiving at least one channel state information reference signal resource transmitted from the mobile communication network based on the channel state information reference signal resource setting. In various embodiments, the method includes generating a set of at least one channel state information report based on the channel state information reporting setting. The at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In some embodiments, the method includes feeding back the set of the at least one channel state information report to the mobile communication network.

One apparatus for channel state information report configuration includes a user equipment. In some embodiments, the apparatus includes a receiver that receives at least one channel state information reporting setting. The at least one channel state information reporting setting includes at least one channel state information reference signal resource setting, and the channel state information reporting setting includes an indication of channel state information feedback reporting for multiple transmission points in a mobile communication network. In various embodiments, the apparatus includes a processor that identifies a set of transmission hypotheses based on the channel state information reporting setting. The hypotheses include a combination of single-point transmission from at least one transmission and reception point, or multi-point joint transmission from two transmission and reception points. In certain embodiments, the apparatus includes a transmitter. The receiver receives at least one channel state information reference signal resource transmitted from the mobile communication network based on the channel state information reference signal resource setting. The processor generates a set of at least one channel state information report based on the channel state information reporting setting. The at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. The transmitter feeds back the set of the at least one channel state information report to the mobile communication network.

Another embodiment of a method for channel state information report configuration includes transmitting, from a network device, at least one channel state information reporting setting. The at least one channel state information reporting setting includes at least one channel state information reference signal resource setting, and the channel state information reporting setting includes an indication of channel state information feedback reporting for multiple transmission points in a mobile communication network. A set of transmission hypotheses is identified based on the channel state information reporting setting, and the hypotheses include a combination of single-point transmission from at least one transmission and reception point, or multi-point joint transmission from two transmission and reception points. In some embodiments, the method includes transmitting at least one channel state information reference signal resource transmitted from the mobile communication network based on the channel state information reference signal resource setting. A set of at least one channel state information report is generated based on the channel state information reporting setting, the at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In certain embodiments, the method includes receiving feedback including the set of the at least one channel state information report in the mobile communication network.

Another apparatus for channel state information report configuration includes a network device. In some embodiments, the apparatus includes a transmitter that: transmits at least one channel state information reporting setting, wherein the at least one channel state information reporting setting includes at least one channel state information reference signal resource setting, and the channel state information reporting setting includes an indication of channel state information feedback reporting for multiple transmission points in a mobile communication network, wherein a set of transmission hypotheses is identified based on the channel state information reporting setting, and the hypotheses include a combination of single-point transmission from at least one transmission and reception point, or multi-point joint transmission from two transmission and reception points; transmits at least one channel state information reference signal resource transmitted from the mobile communication network based on the channel state information reference signal resource setting. A set of at least one channel state information report is generated based on the channel state information reporting setting, the at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In various embodiments, the apparatus includes a receiver that receives feedback including the set of the at least one channel state information report in the mobile communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating a first embodiment of ASN.1 code for a CSI-ReportConfig reporting setting IE with multi-TRP transmission indication;

FIG. 5 is a schematic block diagram illustrating a second embodiment of ASN.1 code for a CSI-ReportConfig reporting setting IE with multi-TRP transmission indication;

FIG. 6 is a schematic block diagram illustrating a third embodiment of ASN.1 code for triggering more than one CMR group in an NZP CSI-RS resource set configuration IE;

FIG. 7 is a schematic block diagram illustrating a fourth embodiment of ASN.1 code for triggering two CSI reports within a CodebookConfig codebook configuration IE;

FIG. 8 is a schematic block diagram illustrating a fifth embodiment of ASN.1 code for triggering two CSI reports within a CSI-ReportConfig reporting setting IE;

FIG. 9 is a schematic block diagram illustrating a sixth embodiment of ASN.1 code for triggering two CSI reports within a CSI-ReportConfig reporting setting IE;

DETAILED DESCRIPTION

Figure 1:
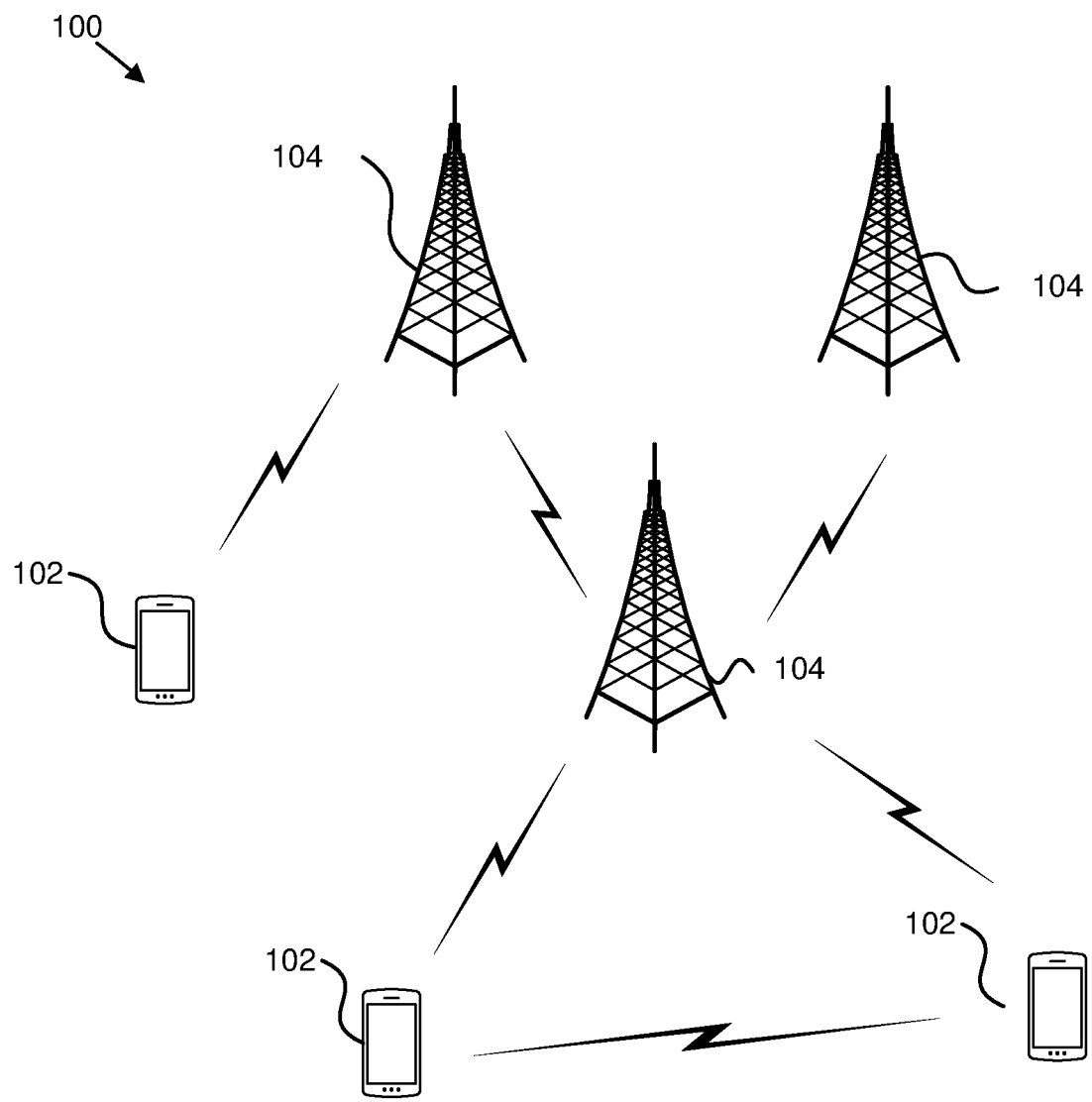
FIG. 1 is a schematic block diagram illustrating one embodiment of a wireless communication system for channel state information report configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information report configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive at least one channel state information reporting setting. The at least one channel state information reporting setting includes at least one channel state information reference signal resource setting, and the channel state information reporting setting includes an indication of channel state information feedback reporting for multiple transmission points in a mobile communication network. In some embodiments, the remote unit 102 may identify a set of transmission hypotheses based on the channel state information reporting setting. The hypotheses include a combination of single-point transmission from at least one transmission and reception point, or multi-point joint transmission from two transmission and reception points. In certain embodiments, the remote unit 102 may receive at least one channel state information reference signal resource transmitted from the mobile communication network based on the channel state information reference signal resource setting. In various embodiments, the remote unit 102 may generate a set of at least one channel state information report based on the channel state information reporting setting. The at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In some embodiments, the remote unit 102 may feed back the set of the at least one channel state information report to the mobile communication network. Accordingly, the remote unit 102 may be used for channel state information report configuration.

In certain embodiments, a network unit 104 may transmit at least one channel state information reporting setting. The at least one channel state information reporting setting includes at least one channel state information reference signal resource setting, and the channel state information reporting setting includes an indication of channel state information feedback reporting for multiple transmission points in a mobile communication network. A set of transmission hypotheses is identified based on the channel state information reporting setting, and the hypotheses include a combination of single-point transmission from at least one transmission and reception point, or multi-point joint transmission from two transmission and reception points. In some embodiments, the network unit 104 may transmit at least one channel state information reference signal resource transmitted from the mobile communication network based on the channel state information reference signal resource setting. A set of at least one channel state information report is generated based on the channel state information reporting setting, the at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In certain embodiments, the network unit 104 may receive feedback including the set of the at least one channel state information report in the mobile communication network. Accordingly, the network unit 104 may be used for channel state information report configuration.

Figure 2:
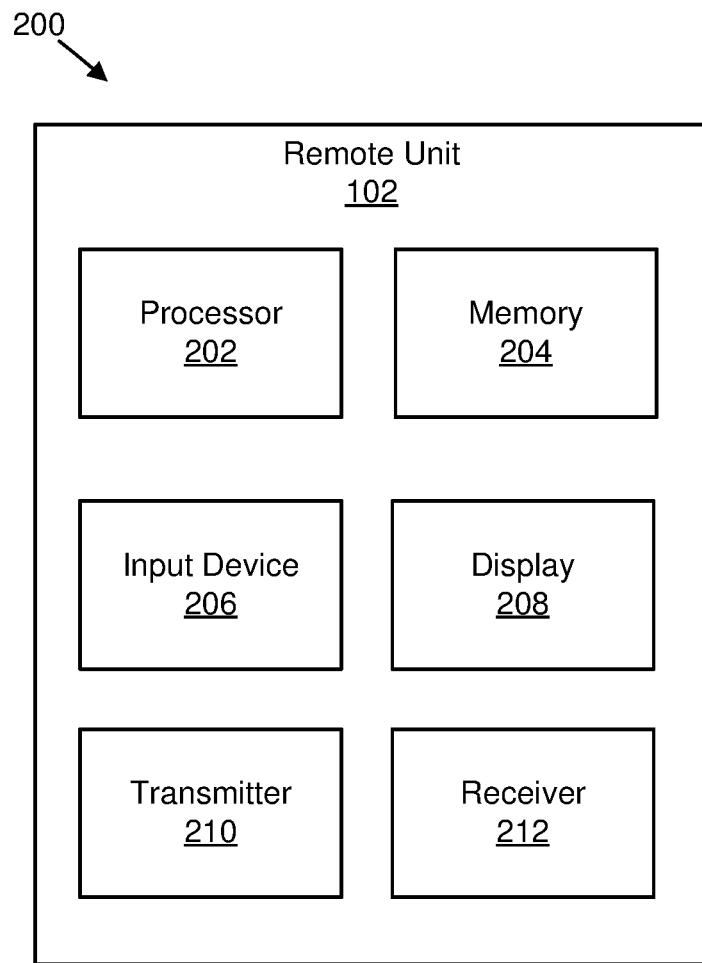
FIG. 2 is a schematic block diagram illustrating one embodiment of an apparatus that may be used for channel state information report configuration.

FIG. 2 depicts one embodiment of an apparatus 200 that may be used for channel state information report configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives at least one channel state information reporting setting. The at least one channel state information reporting setting includes at least one channel state information reference signal resource setting, and the channel state information reporting setting includes an indication of channel state information feedback reporting for multiple transmission points in a mobile communication network. In various embodiments, the processor 202 identifies a set of transmission hypotheses based on the channel state information reporting setting. The hypotheses include a combination of single-point transmission from at least one transmission and reception point, or multi-point joint transmission from two transmission and reception points. The receiver 212 receives at least one channel state information reference signal resource transmitted from the mobile communication network based on the channel state information reference signal resource setting. The processor 202 generates a set of at least one channel state information report based on the channel state information reporting setting. The at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. The transmitter 210 feeds back the set of the at least one channel state information report to the mobile communication network.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
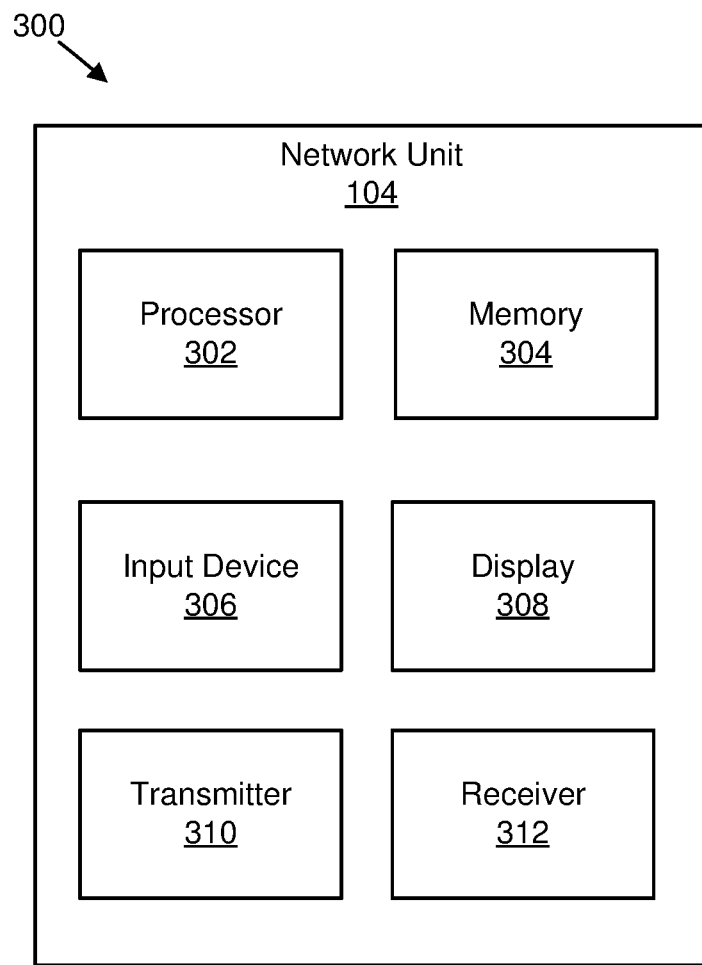
FIG. 3 is a schematic block diagram illustrating one embodiment of an apparatus that may be used for channel state information report configuration.

FIG. 3 depicts one embodiment of an apparatus 300 that may be used for channel state information report configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits at least one channel state information reporting setting, wherein the at least one channel state information reporting setting includes at least one channel state information reference signal resource setting, and the channel state information reporting setting includes an indication of channel state information feedback reporting for multiple transmission points in a mobile communication network, wherein a set of transmission hypotheses is identified based on the channel state information reporting setting, and the hypotheses include a combination of single-point transmission from at least one transmission and reception point, or multi-point joint transmission from two transmission and reception points; transmits at least one channel state information reference signal resource transmitted from the mobile communication network based on the channel state information reference signal resource setting. A set of at least one channel state information report is generated based on the channel state information reporting setting, the at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In various embodiments, the receiver 312 receives feedback including the set of the at least one channel state information report in the mobile communication network.

In certain embodiments, such as for 3GPP new radio ("NR"), multiple transmission and reception points ("TRPs") or multi-antenna panels within a TRP may communicate simultaneously with one user equipment ("UE") to enhance coverage, throughput, and/or reliability. These enhancements may come at the expense of excessive control signaling between the network side and the UE side so as to communicate the best transmission configuration (e.g., whether to support multi-point transmission), and, if so, which TRPs would operate simultaneously, in addition to a possibly super-linear increase in the amount of channel state information ("CSI") feedback reported from the UE to the network, since a distinct report may be needed for each transmission configuration. In some embodiments, such as for a Type-II codebook with high resolution, a number of precoder matrix indicator ("PMI") bits fed back from the UE in a gNB via uplink control information ("UCI") may be very large (e.g., >1000 bits at a large bandwidth) even for a single-point transmission. In such embodiments, reducing the number of PMI feedback bits per report may be crucial to improve efficiency. In various embodiments, multiple input multiple output ("MIMO") enhancements may include multi TRP ("mTRP") and multi-panel transmissions. The purpose of mTRP transmission may be to improve a spectral efficiency as well as a reliability and robustness of a connection, and it may cover both ideal and nonideal backhaul. In certain embodiments, for increasing a reliability using mTRP, ultra-reliable low-latency communication ("URLLC") under mTRP transmission may be used, where the UE may be served by multiple TRPs forming a coordination cluster, possibly connected to a central processing unit.

In some embodiments, a UE may be dynamically scheduled to be served by one of multiple TRPs in a cluster. In such embodiments, the network may pick two TRPs to perform joint transmission. Moreover, in such embodiments, the UE may need to report needed CSI information for the network for it to decide an mTRP downlink transmission scheme.

In various embodiments, a number of transmission hypotheses increases exponentially with a number of TRPs in the coordination cluster. For example, for 4 TRPs, there are 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting dramatically increases with the size of the coordination cluster. In general, the presence of K TRPs may trigger up to $$K + \binom{K}{n},$$

where $$\binom{K}{n}$$

represents a binomial coefficient representing a number of possible unordered n-tuples selected from a set of K elements, where $n \leq K$.

In certain embodiments, UL transmission resources on which CSI reports are transmitted might not be enough, and partial CSI omission may be necessary. In some embodiments, CSI reports may be prioritized according to: 1) time-domain behavior and physical channel, where more dynamic reports are given precedence over less dynamic reports and a physical uplink shared channel ("PUSCH") has precedence over a physical uplink control channel ("PUCCH"); 2) CSI content, where beam reports (e.g., layer 1 ("L1") reference signal received power ("RSRP") ("L1-RSRP") reporting) have priority over regular CSI reports; 3) a serving cell to which the CSI corresponds (e.g., for carrier aggregation ("CA") operation—CSI corresponding to a primary cell ("PCell") has priority over CSI corresponding to secondary cells ("SCells")); and/or 4) a CSI report setting identifier ("ID") (e.g., reportConfigID).

In some embodiments, for the purpose of multi-TRP transmission with either single downlink control information ("DCI") ("single-DCI") or multi-DCI, the following may be achieved: 1) a decomposition of a CSI report under multi-TRP CSI reporting framework; and/or 2) details on uplink control information ("UCI") bit allocation for CSI reporting corresponding to multi-TRP transmission.

Several embodiments are described herein. According to various embodiments, one or more elements or features from one or more of the described embodiments may be combined (e.g., for CSI measurement, feedback generation, and/or reporting) which may reduce overall CSI feedback overhead.

It should be noted that the "TRP" term may include: TRPs, cells, nodes, panels, communication (e.g., signals and/or channels) associated with a control resource set ("CORESET") pool, and/or communication associated with a TCI state from a transmission configuration comprising at least two TCI states. Moreover, it should be noted that a codebook type used may be arbitrary (e.g., a flexibility to use different codebook types (Type-I and Type-II codebooks)) unless otherwise stated.

In certain embodiments, a UE is triggered with two or more DCI, wherein the multi-TRP scheme may be based on spatial division multiplexing ("SDM") (e.g., scheme 1a), frequency division multiplexing ("FDM") (e.g., schemes 2a and/or 2b), and/or time division multiplexing ("TDM") (e.g., schemes 3 and/or 4). Other transmission schemes may also be used. As used herein, a CSI sub-report may denote a component, a segment, or a partition of a CSI report.

In a first set of embodiments, there may be a CSI reporting configuration indication for multi-TRP. In the first set of embodiments, a UE is configured by higher layers with one or more CSI-ReportConfig reporting settings for CSI reporting, one or more CSI-ResourceConfig resource settings for CSI measurement, and one or two lists of trigger states (e.g., given by the higher layer parameters CSI-AperiodicTrigger-StateList and CSI-SemiPersistentOnPUSCH-TriggerStateList). Each trigger state in CSI-AperiodicTriggerStateList may contain a list of a subset of the associated CSI-ReportConfigs indicating the resource set IDs for channel and optionally for interference. Each trigger state in CSI-SemiPersistentOnPUSCH-TriggerStateList may contain one or more associated CSI-ReportConfig. Different embodiments for indication of multi-TRP transmission are provided herein. A setup with a combination of one or more of the embodiments herein may be made.

In a first embodiment of the first set of embodiments, a UE configured with multi-TRP transmission may be configured with a CSI reporting setting CSI-ReportConfig that includes a higher-layer parameter (e.g., mTRP-CSI-Enabled) that configures the UE with multi-TRP transmission (e.g., non-coherent joint transmission ("NCJT")). An example of abstract syntax notation 1 ("ASN.1") code that corresponds to such CSI-ReportConfig reporting setting information element ("IE") is provided in FIG. 4 with a higher-layer parameter that triggers multi-TRP based CSI reporting. Specifically, FIG. 4 is a schematic block diagram illustrating a first embodiment of ASN.1 code 400 for a CSI-ReportConfig reporting setting IE with multi-TRP transmission indication.

In a second embodiment of the first set of embodiments, a UE configured with multi-TRP transmission may be configured with a CSI reporting setting CSI-ReportConfig that includes a higher-layer parameter (e.g., CMRsharing) that configures the UE with multi-TRP transmission with shared channel measurement resources ("CMRs") for single-TRP and multi-TRP transmission hypotheses. An example ASN.1 code that corresponds to such CSI-ReportConfig reporting setting IE is provided in FIG. 5 with a higher-layer parameter that triggers multi-TRP based CSI reporting. Specifically, FIG. 5 is a schematic block diagram illustrating a second embodiment of ASN.1 code 500 for a CSI-Report-Config reporting setting IE with multi-TRP transmission indication.

In a third embodiment of the first set of embodiments, a UE configured with multi-TRP transmission may be configured with a CSI reporting setting (e.g., CSI-ReportConfig) that includes a higher-layer parameter that triggers two groups of CMRs (e.g., two groups of NZP CSI-RS resources for channel measurement, e.g., CMR-Group 1, CMR-Group2, corresponding to the two TRPs). In one example, the higher-layer parameter exists in an IE within the CSI reporting setting (e.g., a non-zero power ("NZP") CSI reference signal ("RS") ("CSI-RS") resource set configuration, NZP-CSI-RS-ResourceSet) that is configured for channel measurement. An example of ASN.1 code that corresponds to this IE is provided in FIG. 6. Specifically, FIG. 6 is a schematic block diagram illustrating a third embodiment of ASN.1 code 600 for triggering more than one CMR group in an NZP CSI-RS resource set configuration IE.

In a fourth embodiment of the first set of embodiments, a UE configured with multi-TRP transmission may be configured with a CSI reporting setting (e.g., CSI-ReportConfig) that includes a higher-layer parameter that triggers a set of N CMR pairs corresponding to CMRs associated with joint transmission from the two TRPs (e.g., nCMR-Pairs) corresponding to the two TRPs. In one example, the higher-layer parameter exists in an IE within the CSI reporting setting (e.g., an NZP CSI-RS resource set configuration, NZP-CSI-RS-ResourceSet) that is configured for channel measurement. An example of ASN.1 code that corresponds to this IE is provided in FIG. 7. Specifically, FIG. 7 is a schematic block diagram illustrating a fourth embodiment of ASN.1 code 700 for triggering two CSI reports within a CodebookConfig codebook configuration IE.

In a fifth embodiment of the first set of embodiments, a UE configured with multi-TRP transmission may be configured with one or more CSI reporting settings CSI-ReportConfig, wherein at least one of the one or more CSI reporting settings CSI-ReportConfig configures two CodebookConfig codebook configurations corresponding to one or more CSI reports. An example of ASN.1 code that corresponds to the CSI-ReportConfig reporting setting IE may be provided in FIG. 8, wherein two codebook configurations are triggered under the same reporting setting. Specifically, FIG. 8 is a schematic block diagram illustrating a fifth embodiment of ASN.1 code 800 for triggering two CSI reports within a CSI-ReportConfig reporting setting IE.

In a sixth embodiment of the first set of embodiments, a UE configured with multi-TRP transmission may be configured with one or more CSI reporting settings CSI-ReportConfig, wherein at least one of the one or more CSI reporting settings CSI-ReportConfig configures two reportQuantity report quantities corresponding to one or more CSI reports. An example of ASN.1 code that corresponds to the CSI-ReportConfig reporting setting IE is provided in FIG. 9. Specifically, FIG. 9 is a schematic block diagram illustrating a sixth embodiment of ASN.1 code 900 for triggering two CSI reports within a CSI-ReportConfig reporting setting IE.

In a seventh embodiment of the first set of embodiments, multi-TRP transmission may correspond to a transmission scheme comprising a physical downlink shared channel ("PDSCH") codeword transmitted from more than one TRP. In a first example, the PDSCH codeword is associated with more than one TCI states. In a second example, a first set of demodulation reference signal ("DMRS") ports for PDSCH is associated with a TCI state with a first NZP CSI-RS resource, and a second set of DMRS ports for PDSCH is associated with a TCI state with a second NZP CSI-RS resource.

In a second set of embodiments, there may be CSI feedback for multi-TRP via CSI sub-reports. In the second set of embodiments, a UE may be configured with a CSI reporting setting CSI-ReportConfig that triggers CSI reporting for one or more transmission hypotheses (e.g., single-TRP transmission hypothesis and NCJT hypothesis). In one example, a single-TRP transmission hypothesis corresponds to CSI reporting based on a single NZP CSI-RS resource for channel measurement (e.g., CMR). In another example, an NCJT hypothesis corresponds to CSI reporting based on an NZP CSI-RS resource pair for channel measurement (e.g., CMR pair). Different embodiments for CSI report content are found herein. A setup with a combination of one or more of embodiments herein may be made.

In a first embodiment of the second set of embodiments, CSI corresponding to one or more transmission hypotheses may be reported within a single CSI report, wherein a CSI report may include: 1) CSI corresponding to one NCJT hypothesis; 2) CSI corresponding to one NCJT hypothesis and one single-TRP transmission hypothesis; 3) CSI corresponding to one NCJT hypothesis and two single-TRP transmission hypotheses; and/or 4) CSI corresponding to a best one transmission hypothesis from a set of one NCJT hypothesis and one or more single-TRP transmission hypotheses.

In a second embodiment of the second set of embodiments, a CSI report including CSI corresponding to at least one NCJT hypothesis is decomposed into one or more CSI sub-reports, partitions, fragments, or segments, wherein each CSI sub-report, partition, fragment, or segment, may represent a transmission hypothesis. In one example, a CSI report corresponding to one NCJT hypothesis and two single-TRP transmission hypotheses includes three CSI sub-reports, wherein a first of the three CSI sub-reports corresponds to an NCJT hypothesis, a second of the three CSI sub-reports corresponds to a first of the two single-TRP transmission hypotheses, and a third of the three CSI sub-reports corresponds to a second of the two single-TRP transmission hypotheses.

In a third set of embodiments, there may be a mapping order of CSI fields for a CSI report under multi-TRP CSI framework.

In a first embodiment of the third set of embodiments, CSI fields of a CSI report configured by a CSI reporting setting corresponding to multi-TRP transmission are mapped in PUCCH in an order of the CSI sub-report index. In one example, CSI fields of a CSI report #n including three CSI sub-reports are mapped in an order of a first of the three CSI sub-reports, a second of the three CSI sub-reports, and a third of the three CSI sub-reports, if reported. An illustration of such mapping is in Table 1.

TABLE 1

Example of the first embodiment of the third
set of embodiments, wherein CSI fields of a
CSI report are mapped in accordance with
the order of the CSI sub-reports

| CSI report number | CSI fields |
|---|---|
| CSI report #n | CSI sub-report #1, if reported<br>CSI sub-report #2, if reported<br>CSI sub-report #3, if reported |

In a second embodiment of the third set of embodiments, CSI sub-reports in a CSI report are ordered based on the transmission hypothesis. In a first example, CSI fields of a CSI report corresponding to one joint transmission hypothesis and two single-point transmission hypotheses are mapped in an order of the CSI sub-report corresponding to joint transmission hypothesis, and then the two CSI sub-reports corresponding to the two single-point transmission hypotheses. In a second example, CSI fields of a CSI report corresponding to one joint transmission hypothesis and two single-point transmission hypotheses are mapped in an order of the two CSI sub-reports corresponding to the two single-point transmission hypotheses, and then the CSI sub-report corresponding to joint transmission hypothesis.

In a third embodiment of the third set of embodiments, two CSI sub-reports corresponding to single-point transmission hypothesis within a same CSI report are ordered based on the two NZP CSI-RS resource IDs associated with the two CSI sub-reports. In a first example, CSI sub-reports corresponding to two single-point transmission hypotheses are mapped in an order of the CSI sub-report associated with a lower NZP CSI-RS resource ID, and then the CSI sub-report associated with a higher NZP CSI-RS resource ID. In a second example, CSI sub-reports corresponding to two single-point transmission hypotheses are mapped in an order of the CSI sub-report associated with a higher NZP CSI-RS resource ID, and then the CSI sub-report associated with a lower NZP CSI-RS resource ID.

In a fourth embodiment of the third set of embodiments, two CSI sub-reports corresponding to single-point transmission hypothesis within a same CSI report are ordered based on the corresponding CMR group index of the two NZP CSI-RS resource IDs associated with the two CSI sub-reports. In a first example, CSI sub-reports corresponding to two single-point transmission hypotheses are mapped in an order of the CSI sub-report associated with an NZP CSI-RS resource of a first of two CMR groups, and then the CSI sub-report associated with an NZP CSI-RS resource of a second of the two CMR groups.

In a fourth set of embodiments, there may be wideband CSI reporting. Such embodiments may primarily apply to CSI reporting over PUCCH.

In a first embodiment of the fourth set of embodiments, CSI fields of a CSI sub-report corresponding to joint transmission for a CSI report with wideband PMI and wideband CQI formats are mapped with respect to the CSI quantity. In a first example, a CSI sub-report #k corresponding to joint transmission includes two rank indicators ("RIs") has the two RIs, if reported, mapped in consecutive order. In a second example, a CSI sub-report #k corresponding to joint transmission including two layer index ("LI") has the two LIs, if reported, mapped in consecutive order. In a third example, a CSI sub-report #k corresponding to joint transmission including two PMI $X_1$ fields has the two PMI $X_1$ fields, if reported, mapped in consecutive order. In a fourth example, a CSI sub-report #k corresponding to joint transmission including two PMI $X_2$ fields has the two PMI $X_2$ fields, if reported, mapped in consecutive order. An illustration of such mappings is in Table 2.

TABLE 2

Example of the first embodiment of the fourth set of embodiments of mapping order of CSI fields of a CSI sub-report corresponding to joint transmission

| CSI sub-report number | CSI fields |
|---|---|
| CSI sub-report #k | CRI, if reported |
| | Rank Indicator 1 with bitwidth 1 bit, if reported |
| | Rank Indicator 2 with bitwidth 1 bit, if reported |
| | Layer Indicator 1 with bitwidth 1 bit, if reported |
| | Layer Indicator 2 with bitwidth 1 bit, if reported |
| | Zero padding bits, if needed |
| | PMI 1 wideband information fields $X_1$, from left to right, if reported |
| | PMI 2 wideband information fields $X_1$, from left to right, if reported |
| | PMI 1 wideband information fields $X_2$, from left to right, if reported |
| | PMI 2 wideband information fields $X_2$, from left to right, if reported |
| | Wideband CQI, if reported |

In a second embodiment of the fourth set of embodiments, CSI fields of a CSI sub-report corresponding to joint transmission for a CSI report with wideband PMI and wideband CQI formats are mapped with respect to the CSI quantity. In a first example, a CSI sub-report #k corresponding to joint transmission including two PMI fields (wherein each PMI fields is further decomposed into two parts $X_1$, $X_2$,) has the two PMI parts $X_1$, $X_2$, of a same PMI, if reported, mapped in consecutive order. An illustration of such mappings is in Table 3.

TABLE 3

Example of the second embodiment of the fourth set of embodiments of mapping order of CSI fields of a CSI sub-report corresponding to joint transmission

| CSI sub-report number | CSI fields |
|---|---|
| CSI sub-report #k | CRI, if reported |
| | Rank Indicator 1 with bitwidth 1 bit, if reported |
| | Rank Indicator 2 with bitwidth 1 bit, if reported |
| | Layer Indicator 1 with bitwidth 1 bit, if reported |
| | Layer Indicator 2 with bitwidth 1 bit, if reported |
| | Zero padding bits, if needed |
| | PMI 1 wideband information fields $X_1$, from left to right, if reported |
| | PMI 1 wideband information fields $X_2$, from left to right, if reported |

TABLE 3-continued

Example of the second embodiment of the fourth set of embodiments of mapping
order of CSI fields of a CSI sub-report corresponding to joint transmission

| CSI sub-report number | CSI fields |
|---|---|
| | PMI 2 wideband information fields $X_1$, from left to right, if reported<br>PMI 2 wideband information fields $X_2$, from left to right, if reported<br>Wideband CQI, if reported |

In a third embodiment of the fourth set of embodiments, CSI fields of a CSI sub-report corresponding to joint transmission for a CSI report with wideband PMI and wideband CQI formats are mapped with respect to the corresponding NZP CSI-RS resource, or CMR group. In a first example, a CSI sub-report #k corresponding to joint transmission including two PMI, two RI, and two LI fields has the first of two RI, the first of two LI, and the first of two PMI fields, if reported, mapped in consecutive order, and the second of two RI, the second of two LI, and the second of two PMI fields, if reported, mapped in consecutive order. An illustration of such mappings is in Table 4.

TABLE 4

Example of the third embodiment of the fourth set of embodiments of mapping
order of CSI fields of a CSI sub-report corresponding to joint transmission

| CSI sub-report number | CSI fields |
|---|---|
| CSI sub-report #k | CRI, if reported<br>Rank Indicator 1 with bitwidth 1 bit, if reported<br>Layer Indicator 1 with bitwidth 1 bit, if reported<br>PMI 1 wideband information fields $X_1^{(1)}$, from left to right, if reported<br>PMI 1 wideband information fields $X_2^{(1)}$, from left to right, if reported<br>Rank Indicator 2 with bitwidth 1 bit, if reported<br>Layer Indicator 2 with bitwidth 1 bit, if reported<br>PMI 2 wideband information fields $X_1^{(2)}$, from left to right, if reported<br>PMI 2 wideband information fields $X_2^{(2)}$, from left to right, if reported<br>Wideband CQI, if reported |

In a fourth embodiment of the fourth set of embodiments, CSI fields of a CSI sub-report corresponding to a single-point transmission hypothesis with wideband PMI and wideband CQI formats of CSI reporting are mapped, if reported.

In a fifth set of embodiments, there may be sub-band CSI reporting. The fifth set of embodiments may apply to CSI reporting over PUCCH or PUSCH.

In a first embodiment of the fifth set of embodiments, a CSI sub-report of a CSI report corresponding to multi-TRP transmission with sub-band PMI format or sub-band CQI format is further decomposed into more than one segment. In one example, the CSI sub-report is decomposed into a CSI Part 1, a CSI Part 2 wideband, and a CSI Part 2 sub-band segments.

In a second embodiment of the fifth set of embodiments, CSI fields of a first of two parts of a CSI report corresponding to multi-TRP transmission with sub-band PMI format or sub-band CQI format are mapped with respect to the transmission hypothesis. In a first example, a CSI report comprising three sub-reports has the CSI Part 1 of the CSI report mapped in the order of CSI Part 1 of the first of the three CSI sub-reports, CSI Part 1 of the second of the three CSI sub-reports, and CSI Part 1 of the third of the three CSI sub-reports. An illustration of such mappings is in Table 5.

TABLE 5

Example of the second embodiment of the fifth set of embodiments
of mapping order of CSI fields of a CSI Part 1 of a CSI report with
sub-band PMI format or sub-band CQI format

| CSI report number | CSI fields |
|---|---|
| CSI report #n<br>CSI part 1 | CSI sub-report #1 CSI part 1, if reported<br>CSI sub-report #2 CSI part 1, if reported<br>CSI sub-report #3 CSI part 1, if reported |

In a third embodiment of the fifth set of embodiments, CSI fields of a CSI Part 1 of a CSI sub-report corresponding to joint transmission for a CSI report with sub-band PMI format or wideband CQI format are mapped with respect to the CSI quantity. In a first example, a CSI Part 1 of a CSI sub-report #k corresponding to joint transmission has the CSI fields reported in the order of CSI-RS resource index ("CRI"), first of two RI, second of two RI, wideband channel quality indicator ("CQI"), and sub-band CQI, if reported. An illustration of such mappings is in Table 6.

TABLE 6

Example of the third embodiment of the fifth set of embodiments of
mapping order of CSI fields of a CSI Part 1 of a CSI sub-report
corresponding to joint transmission

| CSI sub-report number | CSI fields |
|---|---|
| CSI sub-report #k<br>CSI part 1 | CRI, if reported<br>Rank Indicator 1 with bitwidth 1 bit, if reported<br>Rank Indicator 2 with bitwidth 1 bit, if reported<br>Wideband CQI, if reported<br>Subband differential CQI with increasing order of subband number, if reported |

In a fourth embodiment of the fifth set of embodiments, CSI fields of a CSI Part 1 of a CSI sub-report corresponding to a single-point transmission hypothesis with sub-band PMI format or sub-band CQI format of CSI reporting, if reported, are mapped for at least one of PUCCH and PUSCH reporting.

In a fifth embodiment of the fifth set of embodiments, CSI fields of a CSI Part 2 wideband of a CSI report corresponding to multi-TRP transmission with sub-band PMI format or sub-band CQI format are mapped with respect to the transmission hypothesis. In a first example, a CSI report including three sub-reports has the CSI Part 2 wideband of the CSI report mapped in the order of CSI Part 2 wideband of the first of the three CSI sub-reports, CSI Part 2 wideband of the second of the three CSI sub-reports, and CSI Part 2 wideband of the third of the three CSI sub-reports. An illustration of such mappings is in Table 7.

TABLE 7

Example of the fifth embodiment of the fifth set of embodiments of mapping order of CSI fields of a CSI Part 2 wideband of a CSI report with sub-band PMI format or sub-band CQI format

| CSI report number | CSI fields |
| --- | --- |
| CSI report #n CSI part 2 wideband | CSI sub-report #1 CSI part 2 wideband, if reported CSI sub-report #2 CSI part 2 wideband, if reported CSI sub-report #3 CSI part 2 wideband, if reported |

In a sixth embodiment of the fifth set of embodiments, CSI fields of a CSI Part 2 wideband of a CSI sub-report corresponding to joint transmission for a CSI report with sub-band PMI format or wideband CQI format are mapped with respect to the corresponding NZP CSI-RS resource, or CMR group. In a first example, a CSI Part 2 wideband of a CSI sub-report #k corresponding to joint transmission has the CSI fields reported in the order of a first of two LI, a first of two PMI wideband $X_1$, a first of two PMI wideband $X_2$, a second of two LI, a second of two PMI wideband $X_1$, and a second of two PMI wideband $X_2$, if reported. An illustration of such mappings is in Table 8.

TABLE 8

Example of the sixth embodiment of the fifth set of embodiments of mapping order of CSI fields of a CSI Part 2 wideband of a CSI sub-report corresponding to joint transmission

| CSI sub-report number | CSI fields |
| --- | --- |
| CSI sub-report #k CSI part 2 wideband | Layer Indicator 1 with bitwidth 1 bit, if reported PMI 1 wideband information fields $X_1$, from left to right, if reported PMI 1 wideband information fields $X_2$, from left to right, if reported Layer Indicator 2 with bitwidth 1 bit, if reported PMI 2 wideband information fields $X_1$, from left to right, if reported PMI 2 wideband information fields $X_2$, from left to right, if reported |

In a seventh embodiment of the fifth set of embodiments, CSI fields of a CSI Part 2 wideband of a CSI sub-report corresponding to joint transmission for a CSI report with sub-band PMI format or wideband CQI format are mapped with respect to the CSI quantity. In a first example, a CSI Part 2 wideband of a CSI sub-report #k corresponding to joint transmission has the CSI fields reported in the order of two LI, two PMI wideband $X_1$ fields, and two PMI wideband X2 fields, if reported. An illustration of such mappings is in Table 9.

TABLE 9

Example of the seventh embodiment of the fifth set of embodiments of mapping order of CSI fields of a CSI Part 2 wideband of a CSI sub-report corresponding to joint transmission

| CSI sub-report number | CSI fields |
| --- | --- |
| CSI sub-report #k CSI part 2 wideband | Layer Indicator 1 with bitwidth 1 bit, if reported Layer Indicator 2 with bitwidth 1 bit, if reported PMI 1 wideband information fields $X_1^{(1)}$, from left to right, if reported PMI 2 wideband information fields $X_1^{(2)}$, from left to right, if reported PMI 1 wideband information fields $X_2^{(1)}$, from left to right, if reported PMI 2 wideband information fields $X_2^{(2)}$, from left to right, if reported |

In an eighth embodiment of the fifth set of embodiments, CSI fields of a CSI Part 2 wideband of a CSI sub-report corresponding to a single-point transmission hypothesis with sub-band PMI format or sub-band CQI format of CSI reporting, if reported, are mapped in for at least one of PUCCH and PUSCH reporting.

In a ninth embodiment of the fifth set of embodiments, CSI fields of a CSI Part 2 sub-band of a CSI report corresponding to multi-TRP transmission with sub-band PMI format or sub-band CQI format are mapped with respect to the transmission hypothesis. In a first example, a CSI report including three sub-reports has the CSI Part 2 sub-band of the CSI report mapped in the order of CSI Part 2 sub-band of the first of the three CSI sub-reports, CSI Part 2 sub-band of the second of the three CSI sub-reports, and CSI Part 2 sub-band of the third of the three CSI sub-reports. An illustration of such mappings is in Table 10.

TABLE 10

Example of the ninth embodiment of the fifth set of embodiments of mapping order of CSI fields of a CSI Part 2 sub-band of a CSI report with sub-band PMI format or sub-band CQI format

| CSI report number | CSI fields |
|---|---|
| CSI report #n CSI part 2 subband | CSI sub-report #1 CSI part 2 subband, if reported<br>CSI sub-report #2 CSI part 2 subband, if reported<br>CSI sub-report #3 CSI part 2 subband, if reported |

In a tenth embodiment of the fifth set of embodiments, CSI fields of a CSI Part 2 sub-band of a CSI sub-report corresponding to joint transmission for a CSI report with sub-band PMI format or wideband CQI format are mapped with respect to the corresponding NZP CSI-RS resource, or CMR group. In a first example, a CSI Part 2 sub-band of a CSI sub-report #k corresponding to joint transmission has the CSI fields reported in the order of a first of two PMI sub-band $X_1$, a first of two PMI sub-band $X_2$, a second of two PMI sub-band $X_1$, and a second of two PMI sub-band $X_2$, if reported. An illustration of such mappings is in Table 11.

TABLE 11

Example of the tenth embodiment of the fifth set of embodiments of mapping order of CSI fields of a CSI Part 2 sub-band of a CSI sub-report corresponding to joint transmission

| CSI sub-report number | CSI fields |
|---|---|
| CSI sub-report #k CSI part 2 subband | PMI 1 subband information fields $X_1$ of all even subbands with increasing order of subband number, from left to right, or codebook index for 2 antenna ports of all even subbands with increasing order of subband number, if pmi-FormatIndicator= subbandPMI and if reported<br>PMI 1 subband information fields $X_2$ of all odd subbands with increasing order of subband number, from left to right, or codebook index for 2 antenna ports of all odd subbands with increasing order of subband number, if pmi-FormatIndicator= subbandPMI and if reported<br>PMI 2 subband information fields $X_1$ of all even subbands with increasing order of subband number, from left to right, or codebook index for 2 antenna ports of all even subbands with increasing order of subband number, if pmi-FormatIndicator= subbandPMI and if reported<br>PMI 2 subband information fields $X_2$ of all odd subbands with increasing order of subband number, from left to right, or codebook index for 2 antenna ports of all odd subbands with increasing order of subband number, if pmi-FormatIndicator= subbandPMI and if reported |

In an eleventh embodiment of the fifth set of embodiments, CSI fields of a CSI Part 2 sub-band of a CSI sub-report corresponding to joint transmission for a CSI report with sub-band PMI format or wideband CQI format are mapped with respect to the CSI quantity. In a first example, a CSI Part 2 sub-band of a CSI sub-report #k corresponding to joint transmission has the CSI fields reported in the order of two PMI sub-band $X_1$ fields, and two PMI sub-band $X_2$ fields, if reported. An illustration of such mappings is in Table 12.

TABLE 12

Example of the eleventh embodiment of the fifth set of embodiments of mapping order of CSI fields of a CSI Part 2 sub-band of a CSI sub-report corresponding to joint transmission

| CSI sub-report number | CSI fields |
|---|---|
| CSI sub-report #k CSI part 2 subband | PMI 1 subband information fields $X_1$ of all even subbands with increasing order of subband number, from left to right, or codebook index for 2 antenna ports of all even subbands with increasing order of subband number, if pmi-FormatIndicator= subbandPMI and if reported<br>PMI 2 subband information fields $X_1$ of all even subbands with increasing order of subband number, from left to right, or codebook index for 2 antenna |

TABLE 12-continued

Example of the eleventh embodiment of the fifth set of embodiments of mapping order of CSI fields of a CSI Part 2 sub-band of a CSI sub-report corresponding to joint transmission

| CSI sub-report number | CSI fields |
|---|---|
| | ports of all even subbands with increasing order of subband number, if pmi-FormatIndicator= subbandPMI and if reported<br>PMI 1 subband information fields $X_2$ of all odd subbands with increasing order of subband number, from left to right, or codebook index for 2 antenna ports of all odd subbands with increasing order of subband number, if pmi-FormatIndicator= subbandPMI and if reported<br>PMI 2 subband information fields $X_2$ of all odd subbands with increasing order of subband number, from left to right, or codebook index for 2 antenna ports of all odd subbands with increasing order of subband number, if pmi-FormatIndicator= subbandPMI and if reported |

In a twelfth embodiment of the fifth set of embodiments, CSI fields of a CSI Part 2 sub-band of a CSI sub-report corresponding to a single-point transmission hypothesis with sub-band PMI format or sub-band CQI format of CSI reporting, if reported, are mapped in for at least one of PUCCH and PUSCH reporting.

In various embodiments, combinations of one or more embodiments herein may be made. In a first implementation, a combination of the first, second, third, fourth, fifth, sixth, eighth, ninth, tenth, and twelfth embodiments of the fifth set of embodiments may be simultaneously applied. In a second implementation, a combination of the first, second, third, fourth, fifth, seventh, eighth, eighth, ninth, eleventh, and twelfth embodiments of the fifth set of embodiments may be simultaneously applied.

In a sixth set of embodiments, there may be a second CSI part priority for CSI reports under multi-TRP CSI framework. In such embodiments, a UE may be configured with reporting one or more CSI reports (e.g., NRep CSI reports over PUSCH or PUCCH). If any of the CSI reports has two parts, the UE may omit a portion of second part (e.g., Part 2) CSI. Omission of Part 2 CSI is according to a priority order across the NRep CSI reports. Part 2 CSI is omitted beginning with the lowest priority level until the Part 2 CSI code rate is less or equal to the one configured by higher layer parameter maxCodeRate. Different embodiments of the priority order are found herein. According to possible embodiments, combinations of one embodiment of the priority order across reports with other embodiments herein may be made.

In a first embodiment of the sixth set of embodiments, Part 2 wideband CSI of the NRep CSI reports have the highest priority level of CSI reporting.

In a second embodiment of the sixth set of embodiments, a CSI priority level of CSI reports is based on mapping Part 2 CSI for CSI reports, wherein wideband CSI of the CSI reports have the highest priority, and sub-band CSI are mapped first across CSI sub-reports of a CSI report, and secondly across CSI reports.

In one example, CSI priority of two CSI reports with three sub-reports per CSI report are mapped with the following order: Part 2 wideband CSI for all CSI reports 1 and 2, Part 2 sub-band CSI of sub-report 1 of CSI report 1, Part 2 sub-band CSI of sub-report 2 of CSI report 1 if reported, Part 2 sub-band CSI of sub-report 3 of CSI report 1 if reported, Part 2 sub-band CSI of sub-report 1 of CSI report 2, Part 2 sub-band CSI of sub-report 2 of CSI report 2 if reported, and Part 2 sub-band CSI of sub-report 3 of CSI report 2 if reported.

An example of this priority level mapping is found in Table 13, wherein upper rows of the table represent a higher priority level compared with lower rows of the table.

TABLE 13

An example of the second embodiment of the sixth set of embodiments CSI lriority level for CSI omission Priority 0:
For CSI reports 1 to NRep, Part 2 wideband CSI for CSI reports
Priority 1:
For CSI report 1, Part 2 sub-band CSI of CSI sub-report 1
Priority 2:
For CSI report 1, Part 2 sub-band CSI of CSI sub-report 2, if reported
Priority 3:
For CSI report 1, Part 2 sub-band CSI of CSI sub-report 3, if reported
Priority 4:
For CSI report 2, Part 2 sub-band CSI of CSI sub-report 1
Priority 5:
For CSI report 2, Part 2 sub-band CSI of CSI sub-report 2, if reported
Priority 6:
For CSI report 2, Part 2 sub-band CSI of CSI sub-report 3, if reported
. . .
Priority 3NRep −2:
For CSI report NRep, Part 2 sub-band CSI of CSI sub-report 1
Priority 3NRep −1:
For CSI report NRep, Part 2 sub-band CSI of CSI sub-report 2, if reported
Priority 3NRep:
For CSI report NRep, Part 2 sub-band CSI of CSI sub-report 3, if reported In a third embodiment of the sixth set of embodiments, a CSI priority level of CSI reports is based on mapping Part 2 CSI for CSI reports, wherein wideband CSI of the CSI reports have the highest priority, and sub-band CSI are mapped first across CSI reports for a given CSI sub-report index, and secondly across CSI sub-report indices.

In one example, CSI priority of two CSI reports with three sub-reports per CSI report are mapped with the following order: Part 2 Wideband CSI for all CSI reports 1 and 2, Part 2 sub-band CSI of sub-report 1 of CSI report 1, Part 2 sub-band CSI of sub-report 1 of CSI report 2, Part 2 sub-band CSI of sub-report 2 of CSI report 1 if reported, Part 2 sub-band CSI of sub-report 2 of CSI report 2 if reported, Part 2 sub-band CSI of sub-report 3 of CSI report 1 if reported, and Part 2 sub-band CSI of sub-report 3 of CSI report 2 if reported.

An example of this priority level mapping is found in Table 14, wherein upper rows of the table represent a higher priority level compared with lower rows of the table.

TABLE 14

An example of the third embodiment of the sixth set of embodiments CSI priority level for CSI omission Priority 0:
For CSI reports 1 to NRep, Part 2 wideband CSI for CSI reports
Priority 1:
For CSI report 1, Part 2 sub-band CSI of CSI sub-report 1
Priority 2:
For CSI report 2, Part 2 sub-band CSI of CSI sub-report 1
. . .
Priority NRep:
For CSI report NRep, Part 2 sub-band CSI of CSI sub-report 1
Priority NRep +1:
For CSI report 1, Part 2 sub-band CSI of CSI sub-report 2, if reported
Priority NRep +2:
For CSI report 2, Part 2 sub-band CSI of CSI sub-report 2, if reported
. . .
Priority 2NRep:
For CSI report NRep, Part 2 sub-band CSI of CSI sub-report 2, if reported
Priority 2NRep +1:
For CSI report 1, Part 2 sub-band CSI of CSI sub-report 3, if reported
Priority 2NRep +2:
For CSI report 2, Part 2 sub-band CSI of CSI sub-report 3, if reported
. . .
Priority 3NRep:
For CSI report NRep, Part 2 sub-band CSI of CSI sub-report 3, if reported In a fourth embodiment of the sixth set of embodiments, a CSI priority level of CSI reports is based on mapping Part 2 CSI for CSI reports, wherein sub-band CSI is decomposed into two groups of an even sub-bands group and on odd sub-bands group, wideband CSI of the CSI reports have the highest priority, sub-band CSI are mapped first across CSI reports for a given CSI sub-report index and a given sub-band CSI group, secondly across CSI sub-report indices for a given sub-band CSI group, and thirdly across the CSI sub-band groups of even and odd sub-band CSI.

In one example, CSI priority of two CSI reports with three sub-reports per CSI report are mapped with the following order: Part 2 Wideband CSI for all CSI reports 1 and 2, Part 2 sub-band of even sub-bands of CSI of sub-report 1 of CSI report 1, Part 2 sub-band CSI of even sub-bands of sub-report 1 of CSI report 2, Part 2 sub-band CSI of even sub-bands of sub-report 2 of CSI report 1 if reported, Part 2 sub-band CSI of even sub-bands of sub-report 2 of CSI report 2 if reported, Part 2 sub-band CSI of even sub-bands of sub-report 3 of CSI report 1 if reported, Part 2 sub-band CSI of even sub-bands of sub-report 3 of CSI report 2 if reported, Part 2 sub-band of odd sub-bands of CSI of sub-report 1 of CSI report 1, Part 2 sub-band CSI of odd sub-bands of sub-report 1 of CSI report 2, Part 2 sub-band CSI of odd sub-bands of sub-report 2 of CSI report 1 if reported, Part 2 sub-band CSI of odd sub-bands of sub-report 2 of CSI report 2 if reported, Part 2 sub-band CSI of odd sub-bands of sub-report 3 of CSI report 1 if reported, and Part 2 sub-band CSI of odd sub-bands of sub-report 3 of CSI report 2 if reported.

An example of this priority level mapping is found in Table 15, wherein upper rows of the table represent a higher priority level compared with lower rows of the table.

TABLE 15

An example of the fourth embodiment of the sixth set of embodiments CSI priority level for CSI omission Priority 0:
For CSI reports 1 to NRep, Part 2 wideband CSI for CSI reports
Priority 1:
For CSI report 1, Part 2 sub-band CSI of even sub-bands of CSI sub-report 1
Priority 2:
For CSI report 2, Part 2 sub-band CSI of even sub-bands of CSI sub-report 1
. . .
Priority NRep:
For CSI report NRep, Part 2 sub-band CSI of even sub-bands of CSI sub-report 1
Priority NRep +1:
For CSI report 1, Part 2 sub-band CSI of even sub-bands of CSI sub-report 2, if reported
Priority NRep +2:
For CSI report 2, Part 2 sub-band CSI of even sub-bands of CSI sub-report 2, if reported
. . .
Priority 2NRep:
For CSI report NRep, Part 2 sub-band CSI of even sub-bands of CSI sub-report 2, if reported
Priority 2NRep +1:
For CSI report 1, Part 2 sub-band CSI of even sub-bands of CSI sub-report 3, if reported
Priority 2NRep +2:
For CSI report 2, Part 2 sub-band CSI of even sub-bands of CSI sub-report 3, if reported
. . .
Priority 3NRep:
For CSI report NRep, Part 2 sub-band CSI of even sub-bands of CSI sub-report 3, if reported
Priority 3NRep +1:
For CSI report 1, Part 2 sub-band CSI of odd sub-bands of CSI sub-report 1
Priority 3NRep +2:
For CSI report 2, Part 2 sub-band CSI of odd sub-bands of CSI sub-report 1
. . .
Priority 4NRep:
For CSI report $N_{Rep}$, Part 2 sub-band CSI of odd sub-bands of CSI sub-report 1
Priority 4NRep +1:
For CSI report 1, Part 2 sub-band CSI of odd sub-bands of CSI sub-report 2, if reported
Priority 4NRep +2:
For CSI report 2, Part 2 sub-band CSI of odd sub-bands of CSI sub-report 2, if reported
. . .
Priority 5NRep:
For CSI report $N_{Rep}$, Part 2 sub-band CSI of odd sub-bands of CSI sub-report 2, if reported
Priority 5NRep +1:
For CSI report 1, Part 2 sub-band CSI of odd sub-bands of CSI sub-report 3, if reported
Priority 5NRep +2:

TABLE 15-continued

An example of the fourth embodiment of the sixth set of embodiments CSI priority level for CSI omission For CSI report 2, Part 2 sub-band CSI of odd sub-bands of CSI sub-report 3, if reported
. . .
Priority 6NRep:
For CSI report $N_{Rep}$, Part 2 sub-band CSI of odd sub-bands of CSI sub-report 3, if reported

---

In a fifth embodiment of the sixth set of embodiments, a CSI priority level of CSI reports is based on mapping Part 2 CSI for CSI reports, wherein the CSI are mapped first across CSI reports for a given CSI sub-report index, and secondly across CSI sub-report indices.

In one example, CSI priority of two CSI reports with three sub-reports per CSI report are mapped with the following order: Part 2 Wideband CSI of CSI sub-report 1 for all CSI reports 1 and 2, Part 2 sub-band CSI of sub-report 1 of CSI report 1, Part 2 sub-band CSI of sub-report 1 of CSI report 2, Part 2 Wideband CSI of CSI sub-report 2 for all CSI reports 1, 2, Part 2 sub-band CSI of sub-report 2 of CSI report 1 if reported, Part 2 sub-band CSI of sub-report 2 of CSI report 2 if reported, Part 2 Wideband CSI of CSI sub-report 3 for all CSI reports 1, 2, Part 2 sub-band CSI of sub-report 3 of CSI report 1 if reported, and Part 2 sub-band CSI of sub-report 3 of CSI report 2 if reported.

An example of this priority level mapping is found in Table 16, wherein upper rows of the table represent a higher priority level compared with lower rows of the table.

TABLE 16

An example of the fifth embodiment of the sixth set of embodiments CSI priority level for CSI omission Priority 0:
For CSI reports 1 to NRep, Part 2 wideband CSI of CSI sub-report 1
Priority 1:
For CSI report 1, Part 2 sub-band CSI of CSI sub-report 1
Priority 2:
For CSI report 2, Part 2 sub-band CSI of CSI sub-report 1
. . .
Priority NRep:
For CSI report NRep, Part 2 sub-band CSI of CSI sub-report 1
Priority NRep +1:
For CSI reports 1 to $N_{Rep}$, Part 2 wideband CSI of CSI sub-report 2, if reported
Priority NRep +2:
For CSI report 1, Part 2 sub-band CSI of CSI sub-report 2, if reported
Priority NRep +3:
For CSI report 2, Part 2 sub-band CSI of CSI sub-report 2, if reported
. . .
Priority 2NRep+1:
For CSI report NRep, Part 2 sub-band CSI of CSI sub-report 2, if reported
Priority 2NRep +2:
For CSI reports 1 to $N_{Rep}$, Part 2 wideband CSI of CSI sub-report 3, if reported
Priority 2NRep +3:
For CSI report 1, Part 2 sub-band CSI of CSI sub-report 3, if reported
Priority 2NRep +4:
For CSI report 2, Part 2 sub-band CSI of CSI sub-report 3, if reported
. . .
Priority 3NRep +2:
For CSI report NRep, Part 2 sub-band CSI of CSI sub-report 3, if reported

---

In a seventh set of embodiments, there may be a mapping order of CSI fields using a priority function for CSI reports under multi-TRP CSI framework. In such embodiments, there may be a new framework in which CSI fields in a CSI report are mapped with respect to a pre-defined order. The pre-defined order may be described in the form of a priority equation. Different embodiments are provided herein. A setup with a combination of one or more of embodiments herein may be made.

In a first embodiment of the seventh set of embodiments, CSI fields of a CSI report corresponding to multi-TRP transmission are mapped according to a priority function, wherein each CSI field is assigned a priority value of a priority function, and CSI fields of a CSI report are listed in an order of increasing values of the corresponding priority function.

In a second embodiment of the seventh set of embodiments, the output of the priority function output is based on one or more input arguments. In one example, the priority function output is based on three arguments, a first of the three arguments corresponding to the transmission hypothesis, a second of the three arguments corresponding to the CSI quantity, and a third of the three arguments corresponding to an index of a field of a same CSI quantity.

In a third embodiment of the seventh set of embodiments, the priority function takes on the form $Pri(x, y, z)=2Mx+2y+z$. One example of the corresponding variable values is as follows: 1) $z=0$ for a first value of a one CSI quantity; 2) $z=1$ for a second value of the same CSI quantity; 3) $y=0$ for CRI quantity; 4) $y=1$ for RI quantity; 5) $y=2$ for CQI quantity; 6) $y=3$ for LI quantity; 7) $y=4$ for PMI $X_1$ quantity; 8) $y=5$ for PMI $X_2$ quantity; 9) $x=0$ corresponding to joint transmission hypothesis (e.g., NCJT); 10) $x=1$ for a first single-point transmission hypothesis (e.g., a single-TRP hypothesis corresponding to an NZP CSI-RS resource with a lower index value), or corresponding to a first of two CMR groups; 11) $x=2$ for a second single-point transmission hypothesis (e.g., a single-TRP hypothesis corresponding to an NZP CSI-RS resource with a higher index value), or corresponding to a second of two CMR groups; 12) $M=6$ corresponding to the total number of CSI quantities (e.g., given $y=0, 1, \ldots, 5$); and 13) $N=3$ corresponding to the total number of transmission hypotheses (e.g., given $x=0, 1, 2$).

In a fourth embodiment of the seventh set of embodiments, the priority function takes on the form $Pri(x, y, z)=2Mx+Mz+y$. An example of the values of the priority function parameters may be similar to that of the third embodiment of the sixth set of embodiments.

In a fifth embodiment of the seventh set of embodiments, the priority function takes on the form $Pri(x, y, z)=2Ny+2x+z$. An example of the values of the priority function parameters may be similar to that the third embodiment of the sixth set of embodiments.

In a sixth embodiment of the seventh set of embodiments, CSI fields corresponding to single-point transmission hypotheses have higher priority in the mapping order of CSI fields compared with joint transmission hypothesis. In one example, the indices of the transmission hypotheses may be based on any of the priority functions corresponding to the sixth set of embodiments as follows: 1) $x=0$ for a first single-point transmission hypothesis (e.g., a single-TRP hypothesis corresponding to an NZP CSI-RS resource with a lower index value) or corresponding to a first of two CMR groups; 2) x=1 for a second single-point transmission hypothesis (e.g., a single-TRP hypothesis corresponding to an NZP CSI-RS resource with a higher index value) or corresponding to a second of two CMR groups; and/or 3) x=2 corresponding to joint transmission hypothesis (e.g., NCJT).

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some of the embodiments described herein, an UL TCI state is provided if a device is configured with separate DL and/or UL TCI by radio resource control ("RRC") signaling. The UL TCI state may include a source reference signal which provides a reference for determining UL spatial domain transmission filter for the UL transmission (e.g., dynamic-grant and/or configured-grant based PUSCH, dedicated PUCCH resources) in a component carrier ("CC") or across a set of configured CCs and/or bandwidth parts ("BWPs").

In some of the embodiments described herein, a joint DL and/or UL TCI state is provided if the device is configured with joint DL and/or UL TCI by RRC signaling (e.g., configuration of joint TCI or separate DL and/or UL TCI is based on RRC signaling). The joint DL and/or UL TCI state refers to at least a common source reference RS used for determining both the DL QCL information and the UL spatial transmission filter. The source RS determined from the indicated joint (or common) TCI state provides QCL Type-D indication (e.g., for device-dedicated physical downlink control channel ("PDCCH") and/or PDSCH) and is used to determine UL spatial transmission filter (e.g., for UE-dedicated PUSCH and/or PUCCH) for a CC or across a set of configured CCs and/or BWPs. In one example, the UL spatial transmission filter is derived from the RS of DL QCL Type D in the joint TCI state. The spatial setting of the UL transmission may be according to the spatial relation with a reference to the source RS configured with qcl-Type set to 'typeD' in the joint TCI state.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 10:
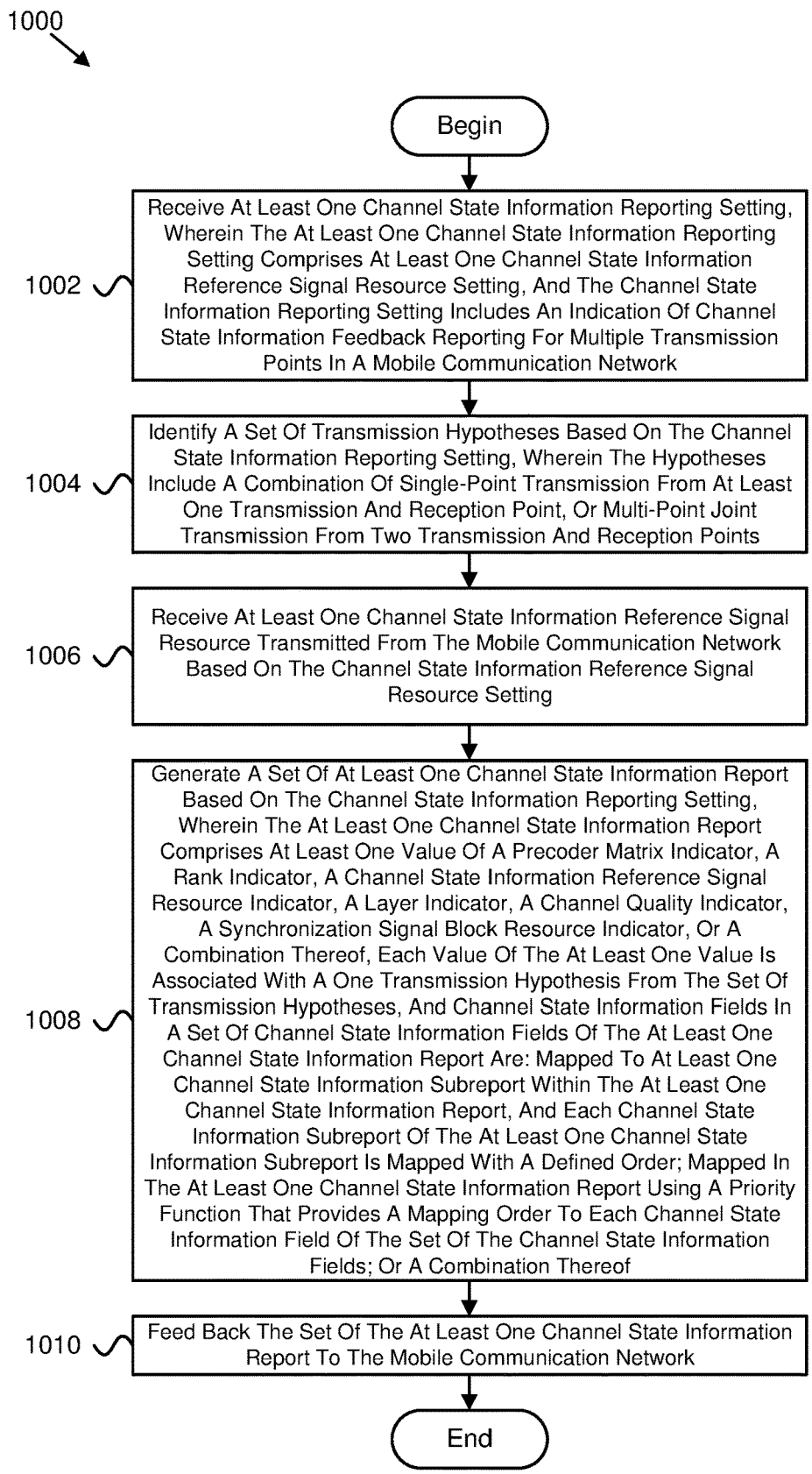
FIG. 10 is a flow chart diagram illustrating one embodiment of a method for channel state information report configuration.

FIG. 10 is a flow chart diagram illustrating one embodiment of a method 1000 for channel state information report configuration. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002 at least one channel state information reporting setting. The at least one channel state information reporting setting includes at least one channel state information reference signal resource setting, and the channel state information reporting setting includes an indication of channel state information feedback reporting for multiple transmission points in a mobile communication network. In some embodiments, the method 1000 includes identifying 1004 a set of transmission hypotheses based on the channel state information reporting setting. The hypotheses include a combination of single-point transmission from at least one transmission and reception point, or multi-point joint transmission from two transmission and reception points. In certain embodiments, the method 1000 includes receiving 1006 at least one channel state information reference signal resource transmitted from the mobile communication network based on the channel state information reference signal resource setting. In various embodiments, the method 1000 includes generating 1008 a set of at least one channel state information report based on the channel state information reporting setting. The at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In some embodiments, the method 1000 includes feeding 1010 back the set of the at least one channel state information report to the mobile communication network.

In certain embodiments, the indication of channel state information feedback reporting for multiple transmission points in the mobile communication network comprises a configuration parameter, and the configuration parameter: indicates multiple transmission and reception point channel state information reporting; includes at least two channel state information reference signal identifiers corresponding to at least two channel state information reference signal resources; indicates two channel measurement resource group identifiers; indicates multiple codebook configurations; indicates a pair of report quantities; indicates a transmission configuration indicator codepoint in a downlink control information, wherein the transmission configuration indicator codepoint corresponds to two transmission configuration indicator states; or some combination thereof.

In some embodiments, the set of channel state information fields of the at least one channel state information report comprises three channel state information subreports that if reported are mapped in an order comprising: a first channel state information subreport of the three channel state information subreports, a second channel state information subreport of the three channel state information subreports, and a third channel state information subreport of the three channel state information subreports. In various embodiments, two channel state information subreports corresponding to single-point transmission hypothesis within a channel state information report of the at least one channel state information report are ordered based on a corresponding channel measurement resource group identifier comprising two channel state information reference signal resources associated with the two channel state information subreports.

In one embodiment, a channel state information report of the at least one channel state information report comprises three channel state information subreports, a first channel state information part of the channel state information report is mapped in an order of a first channel state information part of a first channel state information subreport of the three channel state information subreports, a first channel state information part of a second channel state information subreport of the three channel state information subreports, and a first channel state information part of a third channel state information subreport of the three channel state information subreports.

In certain embodiments, a channel state information report of the at least one channel state information report comprises three channel state information subreports, a wideband subpart of a second channel state information part of the channel state information report is mapped in an order of a wideband subpart of a second channel state information part of a first channel state information subreport of the three channel state information subreports, a wideband subpart of a second channel state information part of a second channel state information subreport of the three channel state information subreports, and a wideband subpart of a second channel state information part of a third channel state information subreport of the three channel state information subreports.

In some embodiments, a channel state information report of the at least one channel state information report comprises three channel state information subreports, a subband subpart of a second channel state information part of the channel state information report is mapped in an order of a subband subpart of a second channel state information part of a first channel state information subreport of the three channel state information subreports, a subband subpart of a second channel state information part of a second channel state information subreport of the three channel state information subreports, and a subband subpart of a second channel state information part of a third channel state information subreport of the three channel state information subreports.

In various embodiments, a channel state information subreport corresponding to joint transmission comprises two precoder matrix indicator fields, each precoder matrix indicator field of the two precoder matrix indicator fields is decomposed into a first part X1 and a second part X2, and the first part X1 and the second part X2 of the same precoder matrix indicator are mapped in a consecutive order. In one embodiment, a channel state information subreport of a channel state information report of the at least one channel state information report corresponding to multiple transmission and reception point transmission with a subband precoder matrix indicator format or a subband channel quality indicator format is decomposed into more than one segment.

In certain embodiments, the channel state information subreport is decomposed into a first channel state information part, a wideband subpart of a second channel state information part, and a subband subpart of a second channel state information part. In some embodiments, the set of channel state information fields of the at least one channel state information report corresponding to multiple transmission and reception point transmission are mapped based on a priority function, each channel state information field of the set of channel state information fields is assigned a priority value of the priority function, the set of channel state information fields are listed in an order of increasing values of the priority function. In various embodiments, the priority function output comprises one or more arguments of three arguments, a first argument of the three arguments corresponds to the one transmission hypothesis, a second argument of the three arguments corresponds to a channel state information quantity, and a third argument of the three arguments corresponds to an index of a field of the same channel state information quantity.

In one embodiment, a channel state information reporting priority for a second channel state information part of the at least one channel state information report is ordered based on: second part wideband channel state information of the at least one channel state information report, then second part subband channel state information across channel state information subreports of the at least one channel state information report, and then across the at least one channel state information report; the second part wideband channel state information of the at least one channel state information report, then the second part subband channel state information across channel state information subreports of the at least one channel state information report for a given channel state information subreport index, and then across channel state information subreport indices; the second part wideband channel state information of the at least one channel state information report, then the second part subband channel state information across channel state information subreports of the at least one channel state information report for a given channel state information subreport index and a given subband channel state information group, then across the channel state information subreport indices for a given subband channel state information group, and then across the channel state information subband groups, wherein the second part subband channel state information is decomposed into two groups comprising an even subbands group and an odd subbands group; the second part wideband channel state information of the at least one channel state information report and the second part subband channel state information across all channel state information reports for a given channel state information subreport index, and then across channel state information subreport indices; or some combination thereof.

Figure 11:
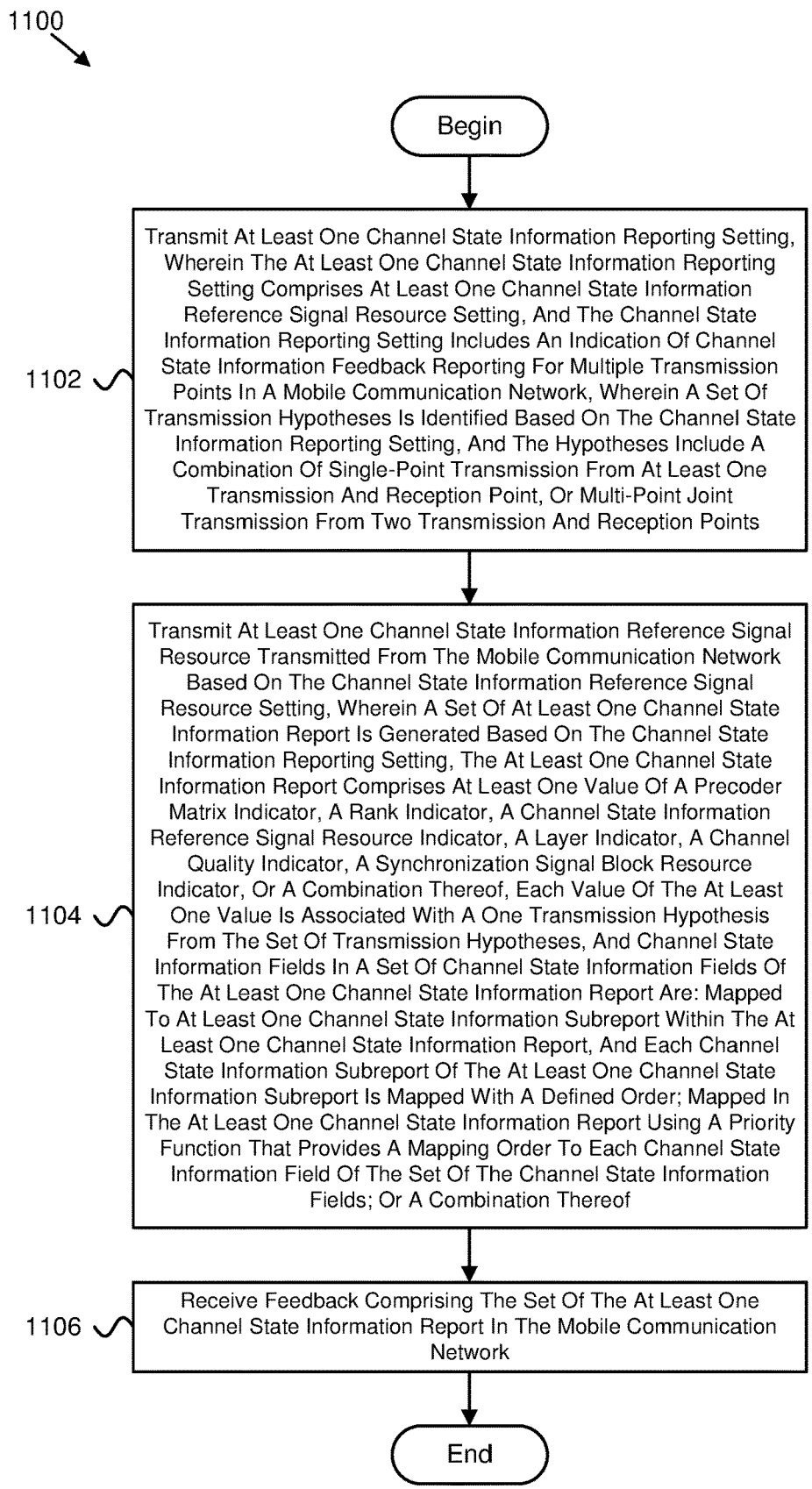
FIG. 11 is a flow chart diagram illustrating another embodiment of a method for channel state information report configuration.

FIG. 11 is a flow chart diagram illustrating another embodiment of a method 1100 for channel state information report configuration. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102 at least one channel state information reporting setting. The at least one channel state information reporting setting includes at least one channel state information reference signal resource setting, and the channel state information reporting setting includes an indication of channel state information feedback reporting for multiple transmission points in a mobile communication network. A set of transmission hypotheses is identified based on the channel state information reporting setting, and the hypotheses include a combination of single-point transmission from at least one transmission and reception point, or multi-point joint transmission from two transmission and reception points. In some embodiments, the method 1100 includes transmitting 1104 at least one channel state information reference signal resource transmitted from the mobile communication network based on the channel state information reference signal resource setting. A set of at least one channel state information report is generated based on the channel state information reporting setting, the at least one channel state information report includes at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof. In certain embodiments, the method 1100 includes receiving 1106 feedback including the set of the at least one channel state information report in the mobile communication network.

In certain embodiments, the indication of channel state information feedback reporting for multiple transmission points in the mobile communication network comprises a configuration parameter, and the configuration parameter: indicates multiple transmission and reception point channel state information reporting; includes at least two channel state information reference signal identifiers corresponding to at least two channel state information reference signal resources; indicates two channel measurement resource group identifiers; indicates multiple codebook configurations; indicates a pair of report quantities; indicates a transmission configuration indicator codepoint in a downlink control information, wherein the transmission configuration indicator codepoint corresponds to two transmission configuration indicator states; or some combination thereof.

In some embodiments, the set of channel state information fields of the at least one channel state information report comprises three channel state information subreports that if reported are mapped in an order comprising: a first channel state information subreport of the three channel state information subreports, a second channel state information subreport of the three channel state information subreports, and a third channel state information subreport of the three channel state information subreports.

In various embodiments, two channel state information subreports corresponding to single-point transmission hypothesis within a channel state information report of the at least one channel state information report are ordered based on a corresponding channel measurement resource group identifier comprising two channel state information reference signal resources associated with the two channel state information subreports.

In one embodiment, a channel state information report of the at least one channel state information report comprises three channel state information subreports, a first channel state information part of the channel state information report is mapped in an order of a first channel state information part of a first channel state information subreport of the three channel state information subreports, a first channel state information part of a second channel state information subreport of the three channel state information subreports, and a first channel state information part of a third channel state information subreport of the three channel state information subreports.

In certain embodiments, a channel state information report of the at least one channel state information report comprises three channel state information subreports, a wideband subpart of a second channel state information part of the channel state information report is mapped in an order of a wideband subpart of a second channel state information part of a first channel state information subreport of the three channel state information subreports, a wideband subpart of a second channel state information part of a second channel state information subreport of the three channel state information subreports, and a wideband subpart of a second channel state information part of a third channel state information subreport of the three channel state information subreports.

In some embodiments, a channel state information report of the at least one channel state information report comprises three channel state information subreports, a subband subpart of a second channel state information part of the channel state information report is mapped in an order of a subband subpart of a second channel state information part of a first channel state information subreport of the three channel state information subreports, a subband subpart of a second channel state information part of a second channel state information subreport of the three channel state information subreports, and a subband subpart of a second channel state information part of a third channel state information subreport of the three channel state information subreports. In various embodiments, a channel state information subreport corresponding to joint transmission comprises two precoder matrix indicator fields, each precoder matrix indicator field of the two precoder matrix indicator fields is decomposed into a first part X1 and a second part X2, and the first part X1 and the second part X2 of the same precoder matrix indicator are mapped in a consecutive order.

In one embodiment, a channel state information subreport of a channel state information report of the at least one channel state information report corresponding to multiple transmission and reception point transmission with a subband precoder matrix indicator format or a subband channel quality indicator format is decomposed into more than one segment. In certain embodiments, the channel state information subreport is decomposed into a first channel state information part, a wideband subpart of a second channel state information part, and a subband subpart of a second channel state information part.

In some embodiments, the set of channel state information fields of the at least one channel state information report corresponding to multiple transmission and reception point transmission are mapped based on a priority function, each channel state information field of the set of channel state information fields is assigned a priority value of the priority function, the set of channel state information fields are listed in an order of increasing values of the priority function. In various embodiments, the priority function output comprises one or more arguments of three arguments, a first argument of the three arguments corresponds to the one transmission hypothesis, a second argument of the three arguments corresponds to a channel state information quantity, and a third argument of the three arguments corresponds to an index of a field of the same channel state information quantity.

In one embodiment, a channel state information reporting priority for a second channel state information part of the at least one channel state information report is ordered based on: second part wideband channel state information of the at least one channel state information report, then second part subband channel state information across channel state information subreports of the at least one channel state information report, and then across the at least one channel state information report; the second part wideband channel state information of the at least one channel state information report, then the second part subband channel state information across channel state information subreports of the at least one channel state information report for a given channel state information subreport index, and then across channel state information subreport indices; the second part wideband channel state information of the at least one channel state information report, then the second part subband channel state information across channel state information subreports of the at least one channel state information report for a given channel state information subreport index and a given subband channel state information group, then across the channel state information subreport indices for a given subband channel state information group, and then across the channel state information subband groups, wherein the second part subband channel state information is decomposed into two groups comprising an even subbands group and an odd subbands group; the second part wideband channel state information of the at least one channel state information report and the second part subband channel state information across all channel state information reports for a given channel state information subreport index, and then across channel state information subreport indices; or some combination thereof.

In one embodiment, a method of a user equipment comprises: receiving at least one channel state information reporting setting, wherein the at least one channel state information reporting setting comprises at least one channel state information reference signal resource setting, and the channel state information reporting setting includes an indication of channel state information feedback reporting for multiple transmission points in a mobile communication network; identifying a set of transmission hypotheses based on the channel state information reporting setting, wherein the hypotheses include a combination of single-point transmission from at least one transmission and reception point, or multi-point joint transmission from two transmission and reception points; receiving at least one channel state information reference signal resource transmitted from the mobile communication network based on the channel state information reference signal resource setting; generating a set of at least one channel state information report based on the channel state information reporting setting, wherein the at least one channel state information report comprises at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof; and feeding back the set of the at least one channel state information report to the mobile communication network.

In certain embodiments, the indication of channel state information feedback reporting for multiple transmission points in the mobile communication network comprises a configuration parameter, and the configuration parameter: indicates multiple transmission and reception point channel state information reporting; includes at least two channel state information reference signal identifiers corresponding to at least two channel state information reference signal resources; indicates two channel measurement resource group identifiers; indicates multiple codebook configurations; indicates a pair of report quantities; indicates a transmission configuration indicator codepoint in a downlink control information, wherein the transmission configuration indicator codepoint corresponds to two transmission configuration indicator states; or some combination thereof.

In some embodiments, the set of channel state information fields of the at least one channel state information report comprises three channel state information subreports that if reported are mapped in an order comprising: a first channel state information subreport of the three channel state information subreports, a second channel state information subreport of the three channel state information subreports, and a third channel state information subreport of the three channel state information subreports.

In various embodiments, two channel state information subreports corresponding to single-point transmission hypothesis within a channel state information report of the at least one channel state information report are ordered based on a corresponding channel measurement resource group identifier comprising two channel state information reference signal resources associated with the two channel state information subreports.

In one embodiment, a channel state information report of the at least one channel state information report comprises three channel state information subreports, a first channel state information part of the channel state information report is mapped in an order of a first channel state information part of a first channel state information subreport of the three channel state information subreports, a first channel state information part of a second channel state information subreport of the three channel state information subreports, and a first channel state information part of a third channel state information subreport of the three channel state information subreports.

In certain embodiments, a channel state information report of the at least one channel state information report comprises three channel state information subreports, a wideband subpart of a second channel state information part of the channel state information report is mapped in an order of a wideband subpart of a second channel state information part of a first channel state information subreport of the three channel state information subreports, a wideband subpart of a second channel state information part of a second channel state information subreport of the three channel state information subreports, and a wideband subpart of a second channel state information part of a third channel state information subreport of the three channel state information subreports.

In some embodiments, a channel state information report of the at least one channel state information report comprises three channel state information subreports, a subband subpart of a second channel state information part of the channel state information report is mapped in an order of a subband subpart of a second channel state information part of a first channel state information subreport of the three channel state information subreports, a subband subpart of a second channel state information part of a second channel state information subreport of the three channel state information subreports, and a subband subpart of a second channel state information part of a third channel state information subreport of the three channel state information subreports.

In various embodiments, a channel state information subreport corresponding to joint transmission comprises two precoder matrix indicator fields, each precoder matrix indicator field of the two precoder matrix indicator fields is decomposed into a first part X1 and a second part X2, and the first part X1 and the second part X2 of the same precoder matrix indicator are mapped in a consecutive order.

In one embodiment, a channel state information subreport of a channel state information report of the at least one channel state information report corresponding to multiple transmission and reception point transmission with a subband precoder matrix indicator format or a subband channel quality indicator format is decomposed into more than one segment.

In certain embodiments, the channel state information subreport is decomposed into a first channel state information part, a wideband subpart of a second channel state information part, and a subband subpart of a second channel state information part.

In some embodiments, the set of channel state information fields of the at least one channel state information report corresponding to multiple transmission and reception point transmission are mapped based on a priority function, each channel state information field of the set of channel state information fields is assigned a priority value of the priority function, the set of channel state information fields are listed in an order of increasing values of the priority function.

In various embodiments, the priority function output comprises one or more arguments of three arguments, a first argument of the three arguments corresponds to the one transmission hypothesis, a second argument of the three arguments corresponds to a channel state information quantity, and a third argument of the three arguments corresponds to an index of a field of the same channel state information quantity.

In one embodiment, a channel state information reporting priority for a second channel state information part of the at least one channel state information report is ordered based on: second part wideband channel state information of the at least one channel state information report, then second part subband channel state information across channel state information subreports of the at least one channel state information report, and then across the at least one channel state information report; the second part wideband channel state information of the at least one channel state information report, then the second part subband channel state information across channel state information subreports of the at least one channel state information report for a given channel state information subreport index, and then across channel state information subreport indices; the second part wideband channel state information of the at least one channel state information report, then the second part subband channel state information across channel state information subreports of the at least one channel state information report for a given channel state information subreport index and a given subband channel state information group, then across the channel state information subreport indices for a given subband channel state information group, and then across the channel state information subband groups, wherein the second part subband channel state information is decomposed into two groups comprising an even subbands group and an odd subbands group; the second part wideband channel state information of the at least one channel state information report and the second part subband channel state information across all channel state information reports for a given channel state information subreport index, and then across channel state information subreport indices; or some combination thereof.

In one embodiment, an apparatus comprises a user equipment. The apparatus further comprises: a receiver that receives at least one channel state information reporting setting, wherein the at least one channel state information reporting setting comprises at least one channel state information reference signal resource setting, and the channel state information reporting setting includes an indication of channel state information feedback reporting for multiple transmission points in a mobile communication network; a processor that identifies a set of transmission hypotheses based on the channel state information reporting setting, wherein the hypotheses include a combination of single-point transmission from at least one transmission and reception point, or multi-point joint transmission from two transmission and reception points; and a transmitter, wherein: the receiver receives at least one channel state information reference signal resource transmitted from the mobile communication network based on the channel state information reference signal resource setting; the processor generates a set of at least one channel state information report based on the channel state information reporting setting, wherein the at least one channel state information report comprises at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof; and the transmitter feeds back the set of the at least one channel state information report to the mobile communication network.

In certain embodiments, the indication of channel state information feedback reporting for multiple transmission points in the mobile communication network comprises a configuration parameter, and the configuration parameter: indicates multiple transmission and reception point channel state information reporting; includes at least two channel state information reference signal identifiers corresponding to at least two channel state information reference signal resources; indicates two channel measurement resource group identifiers; indicates multiple codebook configurations; indicates a pair of report quantities; indicates a transmission configuration indicator codepoint in a downlink control information, wherein the transmission configuration indicator codepoint corresponds to two transmission configuration indicator states; or some combination thereof.

In some embodiments, the set of channel state information fields of the at least one channel state information report comprises three channel state information subreports that if reported are mapped in an order comprising: a first channel state information subreport of the three channel state information subreports, a second channel state information subreport of the three channel state information subreports, and a third channel state information subreport of the three channel state information subreports.

In various embodiments, two channel state information subreports corresponding to single-point transmission hypothesis within a channel state information report of the at least one channel state information report are ordered based on a corresponding channel measurement resource group identifier comprising two channel state information reference signal resources associated with the two channel state information subreports.

In one embodiment, a channel state information report of the at least one channel state information report comprises three channel state information subreports, a first channel state information part of the channel state information report is mapped in an order of a first channel state information part of a first channel state information subreport of the three channel state information subreports, a first channel state information part of a second channel state information subreport of the three channel state information subreports, and a first channel state information part of a third channel state information subreport of the three channel state information subreports.

In certain embodiments, a channel state information report of the at least one channel state information report comprises three channel state information subreports, a wideband subpart of a second channel state information part of the channel state information report is mapped in an order of a wideband subpart of a second channel state information part of a first channel state information subreport of the three channel state information subreports, a wideband subpart of a second channel state information part of a second channel state information subreport of the three channel state information subreports, and a wideband subpart of a second channel state information part of a third channel state information subreport of the three channel state information subreports.

In some embodiments, a channel state information report of the at least one channel state information report comprises three channel state information subreports, a subband subpart of a second channel state information part of the channel state information report is mapped in an order of a subband subpart of a second channel state information part of a first channel state information subreport of the three channel state information subreports, a subband subpart of a second channel state information part of a second channel state information subreport of the three channel state information subreports, and a subband subpart of a second channel state information part of a third channel state information subreport of the three channel state information subreports.

In various embodiments, a channel state information subreport corresponding to joint transmission comprises two precoder matrix indicator fields, each precoder matrix indicator field of the two precoder matrix indicator fields is decomposed into a first part X1 and a second part X2, and the first part X1 and the second part X2 of the same precoder matrix indicator are mapped in a consecutive order.

In one embodiment, a channel state information subreport of a channel state information report of the at least one channel state information report corresponding to multiple transmission and reception point transmission with a subband precoder matrix indicator format or a subband channel quality indicator format is decomposed into more than one segment.

In certain embodiments, the channel state information subreport is decomposed into a first channel state information part, a wideband subpart of a second channel state information part, and a subband subpart of a second channel state information part.

In some embodiments, the set of channel state information fields of the at least one channel state information report corresponding to multiple transmission and reception point transmission are mapped based on a priority function, each channel state information field of the set of channel state information fields is assigned a priority value of the priority function, the set of channel state information fields are listed in an order of increasing values of the priority function.

In various embodiments, the priority function output comprises one or more arguments of three arguments, a first argument of the three arguments corresponds to the one transmission hypothesis, a second argument of the three arguments corresponds to a channel state information quantity, and a third argument of the three arguments corresponds to an index of a field of the same channel state information quantity.

In one embodiment, a channel state information reporting priority for a second channel state information part of the at least one channel state information report is ordered based on: second part wideband channel state information of the at least one channel state information report, then second part subband channel state information across channel state information subreports of the at least one channel state information report, and then across the at least one channel state information report; the second part wideband channel state information of the at least one channel state information report, then the second part subband channel state information across channel state information subreports of the at least one channel state information report for a given channel state information subreport index, and then across channel state information subreport indices; the second part wideband channel state information of the at least one channel state information report, then the second part subband channel state information across channel state information subreports of the at least one channel state information report for a given channel state information subreport index and a given subband channel state information group, then across the channel state information subreport indices for a given subband channel state information group, and then across the channel state information subband groups, wherein the second part subband channel state information is decomposed into two groups comprising an even subbands group and an odd subbands group; the second part wideband channel state information of the at least one channel state information report and the second part subband channel state information across all channel state information reports for a given channel state information subreport index, and then across channel state information subreport indices; or some combination thereof.

In one embodiment, a method of a network device comprises: transmitting at least one channel state information reporting setting, wherein the at least one channel state information reporting setting comprises at least one channel state information reference signal resource setting, and the channel state information reporting setting includes an indication of channel state information feedback reporting for multiple transmission points in a mobile communication network, wherein a set of transmission hypotheses is identified based on the channel state information reporting setting, and the hypotheses include a combination of single-point transmission from at least one transmission and reception point, or multi-point joint transmission from two transmission and reception points; transmitting at least one channel state information reference signal resource transmitted from the mobile communication network based on the channel state information reference signal resource setting, wherein a set of at least one channel state information report is generated based on the channel state information reporting setting, the at least one channel state information report comprises at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof; and receiving feedback comprising the set of the at least one channel state information report in the mobile communication network.

In certain embodiments, the indication of channel state information feedback reporting for multiple transmission points in the mobile communication network comprises a configuration parameter, and the configuration parameter: indicates multiple transmission and reception point channel state information reporting; includes at least two channel state information reference signal identifiers corresponding to at least two channel state information reference signal resources; indicates two channel measurement resource group identifiers; indicates multiple codebook configurations; indicates a pair of report quantities; indicates a transmission configuration indicator codepoint in a downlink control information, wherein the transmission configuration indicator codepoint corresponds to two transmission configuration indicator states; or some combination thereof.

In some embodiments, the set of channel state information fields of the at least one channel state information report comprises three channel state information subreports that if reported are mapped in an order comprising: a first channel state information subreport of the three channel state information subreports, a second channel state information subreport of the three channel state information subreports, and a third channel state information subreport of the three channel state information subreports.

In various embodiments, two channel state information subreports corresponding to single-point transmission hypothesis within a channel state information report of the at least one channel state information report are ordered based on a corresponding channel measurement resource group identifier comprising two channel state information reference signal resources associated with the two channel state information subreports.

In one embodiment, a channel state information report of the at least one channel state information report comprises three channel state information subreports, a first channel state information part of the channel state information report is mapped in an order of a first channel state information part of a first channel state information subreport of the three channel state information subreports, a first channel state information part of a second channel state information subreport of the three channel state information subreports, and a first channel state information part of a third channel state information subreport of the three channel state information subreports.

In certain embodiments, a channel state information report of the at least one channel state information report comprises three channel state information subreports, a wideband subpart of a second channel state information part of the channel state information report is mapped in an order of a wideband subpart of a second channel state information part of a first channel state information subreport of the three channel state information subreports, a wideband subpart of a second channel state information part of a second channel state information subreport of the three channel state information subreports, and a wideband subpart of a second channel state information part of a third channel state information subreport of the three channel state information subreports.

In some embodiments, a channel state information report of the at least one channel state information report comprises three channel state information subreports, a subband subpart of a second channel state information part of the channel state information report is mapped in an order of a subband subpart of a second channel state information part of a first channel state information subreport of the three channel state information subreports, a subband subpart of a second channel state information part of a second channel state information subreport of the three channel state information subreports, and a subband subpart of a second channel state information part of a third channel state information subreport of the three channel state information subreports.

In various embodiments, a channel state information subreport corresponding to joint transmission comprises two precoder matrix indicator fields, each precoder matrix indicator field of the two precoder matrix indicator fields is decomposed into a first part X1 and a second part X2, and the first part X1 and the second part X2 of the same precoder matrix indicator are mapped in a consecutive order.

In one embodiment, a channel state information subreport of a channel state information report of the at least one channel state information report corresponding to multiple transmission and reception point transmission with a subband precoder matrix indicator format or a subband channel quality indicator format is decomposed into more than one segment.

In certain embodiments, the channel state information subreport is decomposed into a first channel state information part, a wideband subpart of a second channel state information part, and a subband subpart of a second channel state information part.

In some embodiments, the set of channel state information fields of the at least one channel state information report corresponding to multiple transmission and reception point transmission are mapped based on a priority function, each channel state information field of the set of channel state information fields is assigned a priority value of the priority function, the set of channel state information fields are listed in an order of increasing values of the priority function.

In various embodiments, the priority function output comprises one or more arguments of three arguments, a first argument of the three arguments corresponds to the one transmission hypothesis, a second argument of the three arguments corresponds to a channel state information quantity, and a third argument of the three arguments corresponds to an index of a field of the same channel state information quantity.

In one embodiment, a channel state information reporting priority for a second channel state information part of the at least one channel state information report is ordered based on: second part wideband channel state information of the at least one channel state information report, then second part subband channel state information across channel state information subreports of the at least one channel state information report, and then across the at least one channel state information report; the second part wideband channel state information of the at least one channel state information report, then the second part subband channel state information across channel state information subreports of the at least one channel state information report for a given channel state information subreport index, and then across channel state information subreport indices; the second part wideband channel state information of the at least one channel state information report, then the second part subband channel state information across channel state information subreports of the at least one channel state information report for a given channel state information subreport index and a given subband channel state information group, then across the channel state information subreport indices for a given subband channel state information group, and then across the channel state information subband groups, wherein the second part subband channel state information is decomposed into two groups comprising an even subbands group and an odd subbands group; the second part wideband channel state information of the at least one channel state information report and the second part subband channel state information across all channel state information reports for a given channel state information subreport index, and then across channel state information subreport indices; or some combination thereof.

In one embodiment, an apparatus comprises a network device. The apparatus further comprises: a transmitter that: transmits at least one channel state information reporting setting, wherein the at least one channel state information reporting setting comprises at least one channel state information reference signal resource setting, and the channel state information reporting setting includes an indication of channel state information feedback reporting for multiple transmission points in a mobile communication network, wherein a set of transmission hypotheses is identified based on the channel state information reporting setting, and the hypotheses include a combination of single-point transmission from at least one transmission and reception point, or multi-point joint transmission from two transmission and reception points; transmits at least one channel state information reference signal resource transmitted from the mobile communication network based on the channel state information reference signal resource setting, wherein a set of at least one channel state information report is generated based on the channel state information reporting setting, the at least one channel state information report comprises at least one value of a precoder matrix indicator, a rank indicator, a channel state information reference signal resource indicator, a layer indicator, a channel quality indicator, a synchronization signal block resource indicator, or a combination thereof, each value of the at least one value is associated with a one transmission hypothesis from the set of transmission hypotheses, and channel state information fields in a set of channel state information fields of the at least one channel state information report are: mapped to at least one channel state information subreport within the at least one channel state information report, and each channel state information subreport of the at least one channel state information subreport is mapped with a defined order; mapped in the at least one channel state information report using a priority function that provides a mapping order to each channel state information field of the set of the channel state information fields; or a combination thereof; and a receiver that receives feedback comprising the set of the at least one channel state information report in the mobile communication network.

In certain embodiments, the indication of channel state information feedback reporting for multiple transmission points in the mobile communication network comprises a configuration parameter, and the configuration parameter: indicates multiple transmission and reception point channel state information reporting; includes at least two channel state information reference signal identifiers corresponding to at least two channel state information reference signal resources; indicates two channel measurement resource group identifiers; indicates multiple codebook configurations; indicates a pair of report quantities; indicates a transmission configuration indicator codepoint in a downlink control information, wherein the transmission configuration indicator codepoint corresponds to two transmission configuration indicator states; or some combination thereof.

In some embodiments, the set of channel state information fields of the at least one channel state information report comprises three channel state information subreports that if reported are mapped in an order comprising: a first channel state information subreport of the three channel state information subreports, a second channel state information subreport of the three channel state information subreports, and a third channel state information subreport of the three channel state information subreports.

In various embodiments, two channel state information subreports corresponding to single-point transmission hypothesis within a channel state information report of the at least one channel state information report are ordered based on a corresponding channel measurement resource group identifier comprising two channel state information reference signal resources as sociated with the two channel state information subreports.

In one embodiment, a channel state information report of the at least one channel state information report comprises three channel state information subreports, a first channel state information part of the channel state information report is mapped in an order of a first channel state information part of a first channel state information subreport of the three channel state information subreports, a first channel state information part of a second channel state information subreport of the three channel state information subreports, and a first channel state information part of a third channel state information subreport of the three channel state information subreports.

In certain embodiments, a channel state information report of the at least one channel state information report comprises three channel state information subreports, a wideband subpart of a second channel state information part of the channel state information report is mapped in an order of a wideband subpart of a second channel state information part of a first channel state information subreport of the three channel state information subreports, a wideband subpart of a second channel state information part of a second channel state information subreport of the three channel state information subreports, and a wideband subpart of a second channel state information part of a third channel state information subreport of the three channel state information subreports.

In some embodiments, a channel state information report of the at least one channel state information report comprises three channel state information subreports, a subband subpart of a second channel state information part of the channel state information report is mapped in an order of a subband subpart of a second channel state information part of a first channel state information subreport of the three channel state information subreports, a subband subpart of a second channel state information part of a second channel state information subreport of the three channel state information subreports, and a subband subpart of a second channel state information part of a third channel state information subreport of the three channel state information subreports.

In various embodiments, a channel state information subreport corresponding to joint transmission comprises two precoder matrix indicator fields, each precoder matrix indicator field of the two precoder matrix indicator fields is decomposed into a first part X1 and a second part X2, and the first part X1 and the second part X2 of the same precoder matrix indicator are mapped in a consecutive order.

In one embodiment, a channel state information subreport of a channel state information report of the at least one channel state information report corresponding to multiple transmission and reception point transmission with a subband precoder matrix indicator format or a subband channel quality indicator format is decomposed into more than one segment.

In certain embodiments, the channel state information subreport is decomposed into a first channel state information part, a wideband subpart of a second channel state information part, and a subband subpart of a second channel state information part.

In some embodiments, the set of channel state information fields of the at least one channel state information report corresponding to multiple transmission and reception point transmission are mapped based on a priority function, each channel state information field of the set of channel state information fields is assigned a priority value of the priority function, the set of channel state information fields are listed in an order of increasing values of the priority function.

In various embodiments, the priority function output comprises one or more arguments of three arguments, a first argument of the three arguments corresponds to the one transmission hypothesis, a second argument of the three arguments corresponds to a channel state information quantity, and a third argument of the three arguments corresponds to an index of a field of the same channel state information quantity.

In one embodiment, a channel state information reporting priority for a second channel state information part of the at least one channel state information report is ordered based on: second part wideband channel state information of the at least one channel state information report, then second part subband channel state information across channel state information subreports of the at least one channel state information report, and then across the at least one channel state information report; the second part wideband channel state information of the at least one channel state information report, then the second part subband channel state information across channel state information subreports of the at least one channel state information report for a given channel state information subreport index, and then across channel state information subreport indices; the second part wideband channel state information of the at least one channel state information report, then the second part subband channel state information across channel state information subreports of the at least one channel state information report for a given channel state information subreport index and a given subband channel state information group, then across the channel state information subreport indices for a given subband channel state information group, and then across the channel state information subband groups, wherein the second part subband channel state information is decomposed into two groups comprising an even subbands group and an odd subbands group; the second part wideband channel state information of the at least one channel state information report and the second part subband channel state information across all channel state information reports for a given channel state information subreport index, and then across channel state information subreport indices; or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
    at least one memory; and
    at least one processor coupled with the at least one memory and configured to cause the UE to:
        receive a channel state information ("CSI") reporting setting;
        identify a transmission hypothesis from a set of transmission hypotheses based on the CSI reporting setting, wherein the set of transmission hypotheses includes a single-point transmission associated with at least one transmission and reception point ("TRP") or a multi-point transmission associated with at least two TRPs;
        receive a set of non-zero power ("NZP") CSI reference signals ("CSI-RSs") associated with a set of NZP CSI-RS resources;
        generate a CSI report based on the CSI reporting setting, the set of NZP CSI-RSs, or both; and
        transmit the CSI report.

2. The UE of claim 1, wherein a CSI sub-report corresponding to multi-point joint transmission comprises two precoder matrix indicator ("PMI") fields, each PMI field of the two PMI fields is decomposed into a first part X1 and a second part X2, and the first part X1 and the second part X2 of the same PMI are mapped in a consecutive order.

3. The UE of claim 1, wherein the CSI report comprises CSI parameters corresponding to multi-point joint transmission from two TRPs.

4. The UE of claim 3, wherein the two TRPs correspond to two NZP CSI-RS resources, two layer indicators ("LI"s), and two precoding matrix indicators ("PMI"s).

5. The UE of claim 3, wherein CSI parameters of the CSI report are mapped in the following order:
    a CSI-RS resource indicator;
    a rank indicator ("RI");
    two layer indicators ("LI"s);
    zero-padding bits;

a first part of a wideband information fields of a first of two precoding matrix indicators ("PMI"s);

a second part of a wideband information fields of the first of the two PMIs;

a first part of a wideband information fields of a second of the two PMIs;

a second part of a wideband information fields of the second of the two PMIs;

a wideband channel quality indicator ("CQI");

or some subset thereof.

6. The UE of claim 1, wherein the CSI report comprises at least one value of a precoder matrix indicator ("PMI"), a rank indicator ("RI"), a CSI-RS resource indicator ("CRI"), a layer indicator ("LI"), a channel quality indicator ("CQI"), or a combination thereof, each value of the at least one value is associated with one transmission hypothesis from the set of transmission hypotheses.

7. The UE of claim 1, wherein CSI fields in a set of CSI fields of the CSI report are mapped to at least one CSI sub-report within the CSI report, and each CSI sub-report of the at least one CSI sub-report is mapped with a defined order.

8. The UE of claim 1, wherein the CSI reporting setting comprises a configuration parameter, and the configuration parameter:

indicates multi-point CSI reporting;

includes two CSI-RS identifiers corresponding to two CSI-RS resources;

indicates two channel measurement resource ("CMR") group identifiers;

indicates multiple codebook configurations;

indicates a pair of report quantities;

indicates a transmission configuration indicator ("TCI") codepoint in a downlink control information, wherein the TCI codepoint corresponds to two TCI states;

or a combination thereof.

9. The UE of claim 1, wherein the set of CSI fields of the CSI report comprises three CSI sub-reports that if reported are mapped in an order comprising: a first CSI sub-report of the three CSI sub-reports, a second CSI sub-report of the three CSI sub-reports, and a third CSI sub-report of the three CSI sub-reports.

10. The UE of claim 9, wherein two CSI sub-reports corresponding to single-point transmission hypothesis within a CSI report are ordered based on a corresponding channel measurement resource ("CMR") group identifier comprising two CSI-RS resources associated with the two CSI sub-reports.

11. The UE of claim 9, wherein the CSI report comprises three CSI sub-reports, a first CSI part of the CSI report is mapped in an order of a first CSI part of a first CSI sub-report of the three CSI sub-reports, a first CSI part of a second CSI sub-report of the three CSI sub-reports, and a first CSI part of a third CSI sub-report of the three CSI sub-reports.

12. The UE of claim 9, wherein the CSI report comprises three CSI sub-reports, a wideband sub-part of a second CSI part of the CSI report is mapped in an order of a wideband sub-part of a second CSI part of a first CSI sub-report of the three CSI sub-reports, a wideband sub-part of a second CSI part of a second CSI sub-report of the three CSI sub-reports, and a wideband sub-part of a second CSI part of a third CSI sub-report of the three CSI sub-reports.

13. The UE of claim 9, wherein the CSI report comprises three CSI sub-reports, a subband sub-part of a second CSI part of the CSI report is mapped in an order of a subband sub-part of a second CSI part of a first CSI sub-report of the three CSI sub-reports, a subband sub-part of a second CSI part of a second CSI sub-report of the three CSI sub-reports, and a subband sub-part of a second CSI part of a third CSI sub-report of the three CSI sub-reports.

14. A processor for wireless communication, comprising:

at least one controller coupled with at least one memory and configured to cause the processor to:

receive a channel state information ("CSI") reporting setting;

identify a transmission hypothesis from a set of transmission hypotheses based on the CSI reporting setting, wherein the set of transmission hypotheses includes a single-point transmission associated with at least one transmission and reception point ("TRP") or a multi-point transmission associated with at least two TRPs;

receive a set of non-zero power ("NZP") CSI reference signals ("CSI-RSs") associated with a set of NZP CSI-RS resources;

generate a CSI report based on the CSI reporting setting, the set of NZP CSI-RSs, or both; and transmit the CSI report.

15. The processor of claim 14, wherein a CSI sub-report corresponding to multi-point joint transmission comprises two precoder matrix indicator ("PMI") fields, each PMI field of the two PMI fields is decomposed into a first part X1 and a second part X2, and the first part X1 and the second part X2 of the same PMI are mapped in a consecutive order.

16. The processor of claim 14, wherein the CSI report comprises CSI parameters corresponding to multi-point joint transmission from two TRPs.

17. The processor of claim 16, wherein the two TRPs correspond to two NZP CSI-RS resources, two layer indicators ("LI"'s), and two precoding matrix indicators ("PMI"s).

18. The processor of claim 16, wherein CSI parameters of the CSI report are mapped in the following order:

a CSI-RS resource indicator;

a rank indicator ("RI");

two layer indicators ("LI"'s);

zero-padding bits;

a first part of a wideband information fields of a first of two precoding matrix indicators ("PMI"s);

a second part of a wideband information fields of the first of the two PMIs;

a first part of a wideband information fields of a second of the two PMIs;

a second part of a wideband information fields of the second of the two PMIs;

a wideband channel quality indicator ("CQI");

or some subset thereof.

19. The processor of claim 14, wherein the CSI report comprises at least one value of a precoder matrix indicator ("PMI"), a rank indicator ("RI"), a CSI-RS resource indicator ("CRI"), a layer indicator ("LI"), a channel quality indicator ("CQI"), or a combination thereof, each value of the at least one value is associated with one transmission hypothesis from the set of transmission hypotheses.

20. A method performed by a user equipment (UE), the method comprising:

receiving a channel state information ("CSI") reporting setting;

identifying a transmission hypothesis from a set of transmission hypotheses based on the CSI reporting setting, wherein the set of transmission hypotheses includes a single-point transmission associated with at least one transmission and reception point ("TRP") or a multi-point transmission associated with at least two TRPs;

receiving a set of non-zero power ("NZP") CSI reference signals ("CSI-RSs") associated with a set of NZP CSI-RS resources;

generating a CSI report based on the CSI reporting setting, the set of NZP CSI-RSs, or both; and transmitting the CSI report.

* * * * *